(12) United States Patent
Morioka et al.

(10) Patent No.: US 9,057,852 B2
(45) Date of Patent: Jun. 16, 2015

(54) OPTICAL RECEPTACLE AND OPTICAL MODULE INCLUDING THE SAME

(71) Applicant: ENPLAS CORPORATION, Kawaguchi-shi, Saitama (JP)

(72) Inventors: Shimpei Morioka, Kawaguchi (JP); Tadanobu Niimi, Kawaguchi (JP); Shinya Kanke, Kawaguchi (JP); Masahiro Tanazawa, Kawaguchi (JP)

(73) Assignee: ENPLAS CORPORATION, Kawaguchi-Shi (JP)

( * ) Notice: Subject to any disclaimer, the term of this patent is extended or adjusted under 35 U.S.C. 154(b) by 0 days.

(21) Appl. No.: 14/357,166

(22) PCT Filed: Nov. 12, 2012

(86) PCT No.: PCT/JP2012/079245
§ 371 (c)(1),
(2) Date: May 8, 2014

(87) PCT Pub. No.: WO2013/080783
PCT Pub. Date: Jun. 6, 2013

(65) Prior Publication Data
US 2014/0328558 A1    Nov. 6, 2014

(30) Foreign Application Priority Data

Dec. 2, 2011  (JP) .................................. 2011264644
Oct. 9, 2012  (JP) .................................. 2012224086

(51) Int. Cl.
*G02B 6/36*  (2006.01)
*G02B 6/42*  (2006.01)

(52) U.S. Cl.
CPC ............ *G02B 6/4214* (2013.01); *G02B 6/4249* (2013.01); *G02B 6/4292* (2013.01); *G02B 6/42* (2013.01); *G02B 6/4204* (2013.01); *G02B 6/4286* (2013.01)

(58) Field of Classification Search
CPC ...... G02B 6/42; G02B 6/4204; G02B 6/4214; G02B 6/4249; G02B 6/4286; G02B 6/4292

USPC ........... 385/14–15, 31, 47, 51, 53, 88–94, 33; 398/135–139
See application file for complete search history.

(56) References Cited

U.S. PATENT DOCUMENTS 5,742,720 A    4/1998  Kobayashi et al.
6,368,890 B1   4/2002  Wickstroem et al.
(Continued)

FOREIGN PATENT DOCUMENTS

JP    H09-127375 A    5/1997
JP    2000-340877 A   12/2000
(Continued)

OTHER PUBLICATIONS

International Search Report (ISR), mailed Dec. 11, 2012, issued for International Application No. PCT/JP2012/079245.

*Primary Examiner* — Ryan Lepisto
*Assistant Examiner* — Guy Anderson
(74) *Attorney, Agent, or Firm* — Law Office of Katsuhiro Arai

(57) ABSTRACT

An optical receptacle disposed between a photoelectric conversion device and an optical fiber includes a light separating section for separating incident light into monitor light and fiber coupled light, which section includes a segmented reflective surface and a segmented transmitting surface. The reflective surface for reflecting light as monitor light is disposed in a segmented manner with spaces in a segmentation direction. The transmitting surface is disposed in a segmented manner in areas where the reflective surface is not disposed, so as to transmit a portion of light other than the reflected light in a direction directly oppose to the direction of the reflected light and to advance the other portion of light towards the side of an end face of the optical fiber.

15 Claims, 19 Drawing Sheets

(56) References Cited

U.S. PATENT DOCUMENTS

| | | | |
|---|---|---|---|
| 6,678,292 B2 | 1/2004 | Wickstroem et al. | |
| 6,913,400 B2 * | 7/2005 | O'Toole et al. | 385/89 |
| 7,559,702 B2 * | 7/2009 | Fujiwara et al. | 385/88 |
| 7,729,581 B2 * | 6/2010 | Rolston et al. | 385/52 |
| 8,787,714 B2 * | 7/2014 | Morioka | 385/33 |
| 2008/0142815 A1 | 6/2008 | Morioka | |
| 2008/0232737 A1 * | 9/2008 | Ishigami et al. | 385/14 |
| 2008/0247713 A1 * | 10/2008 | Tamura et al. | 385/93 |
| 2010/0172617 A1 * | 7/2010 | Sato | 385/88 |
| 2010/0215325 A1 * | 8/2010 | Tamura et al. | 385/89 |
| 2010/0220963 A1 * | 9/2010 | Tamura et al. | 385/88 |
| 2011/0057204 A1 | 3/2011 | Morioka | |
| 2014/0328558 A1 * | 11/2014 | Morioka et al. | 385/33 |
| 2014/0339403 A1 * | 11/2014 | Morioka | 250/227.11 |

FOREIGN PATENT DOCUMENTS

| | | |
|---|---|---|
| JP | 2004-221420 A | 8/2004 |
| JP | 2007-171427 A | 7/2007 |
| JP | 2008-151894 A | 7/2008 |
| JP | 2011-039151 A | 2/2011 |
| JP | 2011-211152 A | 10/2011 |
| WO | 2011/077723 A1 | 6/2011 |

* cited by examiner (a)     (b)

FIG.23
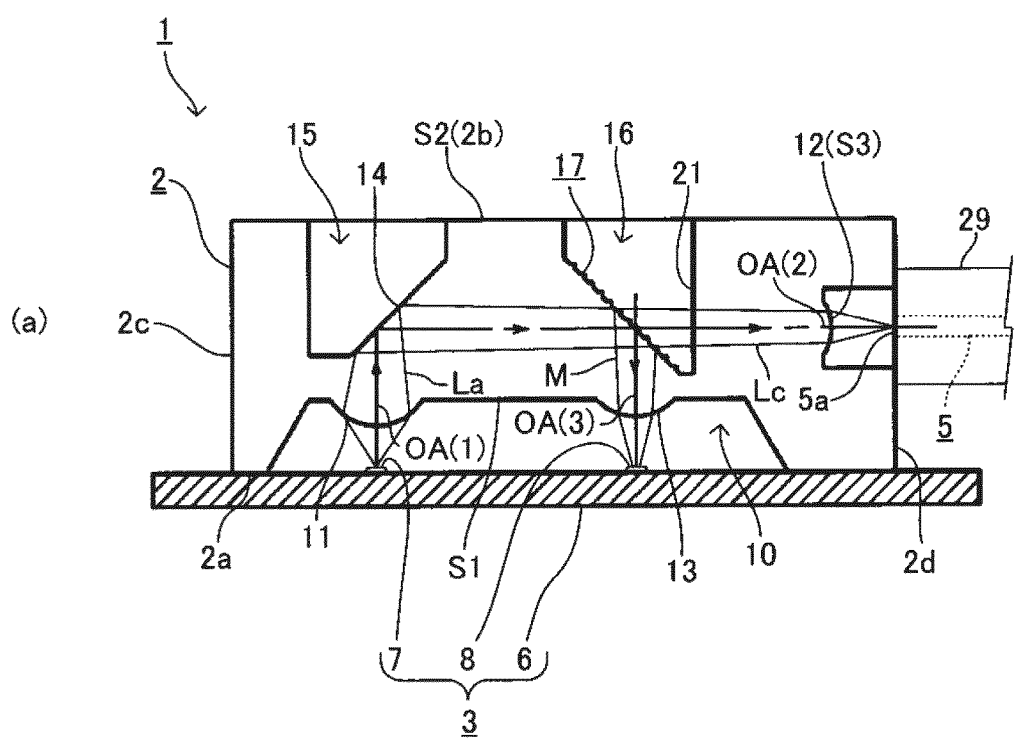
(a)
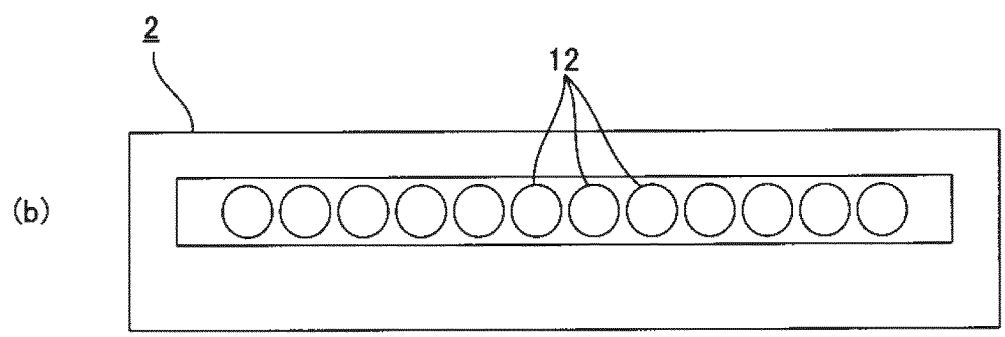
(b)

OPTICAL RECEPTACLE AND OPTICAL MODULE INCLUDING THE SAME

This application is the U.S. National Phase under 35 U.S.C. §371 of International Application PCT/JP2012/079245, filed Nov. 12, 2012, which claims priorities to Japanese Patent Application No. 2011-264644, filed Dec. 2, 2011 and No. 2012-224086, filed Oct. 9, 2012. The International Application was published under PCT Article 21(2) in a language other than English.

TECHNICAL FIELD

The present invention relates to an optical receptacle and an optical module including the optical receptacle. In particular, the present invention relates to an optical receptacle suitable for appropriately optically coupling a light-emitting element and an end face of an optical fiber, and an optical module including the optical receptacle.

BACKGROUND ART

Since the past, an optical module has been used in optical communication using optical fibers, the optical module including a light-emitting element such as a surface light-emitting laser (for example, a vertical cavity surface emitting laser [VCSEL])

In this type of optical module, an optical module component referred to as an optical receptacle is used. The optical receptacle is used in optical transmission via optical fibers by light that includes communication information and has been emitted from the light-emitting element being coupled with an end face of the optical fiber.

In addition, since the past, various proposals have been made regarding the optical module to monitor the light (intensity and amount of light) emitted from the light-emitting element, for the purpose of stabilizing output characteristics of the light-emitting element against temperature changes and adjusting light output.

For example, Patent Literature 1 and Patent Literature 2 propose the use of a photoelectric conversion device in which a light-receiving element for monitoring is enclosed together with a light-emitting element in a package referred to as a TO-CAN. Some of the outgoing light from the light-emitting element is reflected to the light-receiving element side as monitor light at a glass window of the package.

However, in a CAN-package type photoelectric conversion device such as this, during high-frequency drive, crosstalk occurs in some instances as a result of electromagnetic waves leaking from a section of wiring connected to the light-emitting element. In such instances, support of high-speed communication of 10 Gbps or more becomes difficult. Furthermore, in the module using the CAN package, the maximum diameter of the optical receptacle is 6 mm to 7 mm in, for example, a CAN referred to as TO-46. Therefore, size reduction is difficult.

On the other hand, in a substrate-mounted photoelectric conversion device in which the light-emitting element is mounted on a circuit board, unlike the CAN-package type, there are no issues regarding crosstalk. In addition, there are advantages, such as reduced number of components, reduced cost, and reduced size. However, because a glass window is not provided, it is difficult to include a function for generating monitor light on the photoelectric conversion device side.

Therefore, for example, as shown in Patent Literature 3, proposals have been made to actualize stable high-speed communication accompanying monitoring by a reflective surface for reflecting some of the outgoing light from the light-emitting element towards the light-receiving element side as monitor light being formed on the optical receptacle side to support the substrate-mounted photoelectric conversion device.

PRIOR ART LITERATURES

Patent Literature

Patent Literature 1: Japanese Patent Laid-open Publication No. 2000-340877
Patent Literature 2: Japanese Patent Laid-open Publication No. 2004-221420
Patent Literature 3: Japanese Patent Laid-open Publication No. 2008-151894

SUMMARY OF INVENTION

Problem to be Solved by the Invention

The invention described in above-described Patent Literature 3 is configured such that, after the light from the light-emitting element has passed through the optical receptacle, the light is extracted in a direction perpendicular to the substrate of the photoelectric conversion device at the end face of the optical fiber.

However, depending on the format of use of the optical module, in some instances, the light from the light-emitting element is required to be extracted in a direction along the substrate at the end face of the optical fiber. In such instances, to easily and appropriately actualize optical transmission accompanying monitoring, a new method is required that is different from the invention described in Patent Literature 3 and in which the light extraction direction differs.

Therefore, the present invention has been achieved in light of the above-described issues. An object of the present invention is to provide an optical receptacle capable of easily and appropriately actualizing optical transmission accompanying monitoring, in which light from a light-emitting element is extracted in a direction along a substrate at an end face of an optical fiber, and an optical module including the optical receptacle.

Means for Solving Problem

To achieve the above-described object, an optical receptacle according to a first aspect of the present invention is an optical receptacle that is disposed between a photoelectric conversion device and an optical fiber, the photoelectric conversion device in which a light-emitting element and a light-receiving element that receives monitor light for monitoring light emitted from the light-emitting element are mounted on a substrate, and is capable of optically coupling the light-emitting element and an end face of the optical fiber. The optical receptacle includes: a first surface of an optical receptacle main body on which the light from the light-emitting element is incident and from which the monitor light is emitted towards the light-receiving element; a reflective surface that is formed on a second surface of the optical receptacle main body on a side opposite to the first surface such as to have a predetermined first slope angle in relation to the first surface and such that the light of the light-emitting element that has been incident on the first surface is incident thereon from an interior side of the optical receptacle main body, and that reflects the incident light of the light-emitting element; a recessing section that is provided in a recessing manner in a position on the second surface on a reflection direction side of the light of the light-emitting element in relation to the reflective surface; a light separating section that forms a portion of an inner surface of the recessing section, on which the light of the light-emitting element that has been reflected by the reflective surface is incident from the interior side of the optical receptacle main body, and that separates the incident light into the monitor light that advances towards the first surface and light to be coupled with the end face of the optical fiber; and a third surface of the optical receptacle main body from which the light to be coupled with the end face of the optical fiber that has been separated by the light separating section is emitted towards the end face of the optical fiber. The light separating section includes: a segmented reflective surface that has a predetermined second slope angle in relation to the first surface and is disposed in a segmented manner with predetermined spaces in a predetermined segmentation direction, on which a portion of light of the light of the light-emitting element that has been reflected by the reflective surface is incident, and that reflects the incident portion of light as the monitor light; and a segmented transmitting surface that is disposed in a segmented manner such as to be positioned in non-placement areas of the segmented reflective surface, that is disposed such as to directly opposing the reflection direction of the light of the light-emitting element in relation to the reflective surface, on which another portion of light other than the portion of light of the light of the light-emitting element that has been reflected by the reflective surface is incident, and that transmits the incident other portion of light and advances the other portion of light towards the third surface side as the light to be coupled with the end face of the optical fiber. The optical receptacle main body includes transmitting surface that forms a section on the inner surface of the recessing section that opposes the light separating section, on which the light to be coupled with the end face of the optical fiber that has been transmitted by the segmented transmitting surface is incident via space within the recessing section, and that transmits the incident light towards the third surface side.

In the invention according to the first aspect, the light of the light-emitting element that has been incident on the first surface is reflected by the reflective surface. The light is then separated into the monitor light (reflected light) and the light to be coupled with the end face of the optical fiber (transmitted light) as a result of reflection by the segmented reflective surface of the light separating section and transmittance by the segmented transmitting surface of the light separating section. The monitor light can be emitted from the first surface towards the light-receiving element side. The light to be coupled with the end face of the optical fiber can be emitted from the third surface towards the side of the end face of the optical fiber. Therefore, acquiring the monitor light and extracting the light of the light-emitting element in the direction along the substrate at the end face of the optical fiber can be easily performed. In addition, at this time, because the segmented transmitting surface is disposed in a segmented manner, the overall cross-sectional shape (cross-section perpendicular to the advancing direction) of the light to be coupled with the end face of the optical fiber can be made similar to a circular shape. Therefore, significant decrease in optical coupling efficiency can be prevented even when positional misalignment of a certain extent occurs in the radial direction of the optical fiber. Thus, optical transmission accompanying monitoring can be appropriately performed. In addition, because appropriate optical transmission such as this is ensured, positional accuracy of the optical fiber in relation to the optical receptacle can be relaxed.

In addition, an optical receptacle according to a second aspect of the present invention is the optical receptacle according to the first aspect in which, further, the segmentation direction is a slope direction of the segmented reflective surface. The segmented reflective surface is composed of a plurality of reflective surface portions that are elongated in a direction perpendicular to the slope direction and a normal direction of the segmented reflective surface. The segmented transmitting surface is composed of a plurality of transmitting surface portions that are elongated along a length direction of the reflective surface portion. The transmitting surface portion is disposed such as to be connected to the reflective surface portion adjacent thereto on the first surface side and perpendicular to the incidence direction of the other portion of light in relation to the transmitting surface portion. A stepped surface is formed between the transmitting surface portion and the reflective surface portion adjacent thereto on the second surface side, along the incidence direction of the light of the light-emitting element in relation to the light separating section.

In the invention according to the second aspect, when the optical receptacle is resin-molded using an a mold, during the molding process, shape transfer surfaces of the segmented transmitting surface (transmitting surface portions) and the stepped surface may be formed between the shape transfer surfaces of the segmented reflective surface (reflective surface portions) by groove processing using a tool. As a result, a mold having favorable dimensional accuracy can be easily and quickly acquired at low cost. In addition, as a result of the stepped surface, which is unavoidable in such instances, being formed in parallel with the optical path, the effect of the stepped surface on optical performance can be minimized.

Furthermore, an optical receptacle according to a third aspect of the present invention is the optical receptacle according to the first aspect in which, further, the segmentation direction is a direction perpendicular to the first surface. The segmented reflective surface is composed of a plurality of reflective surface portions that are elongated in a direction perpendicular to the slope direction and a normal direction thereof. The segmented transmitting surface is composed of a plurality of transmitting surface portions that are elongated along the length direction of the reflective surface portion. The transmitting surface portion is disposed such as to be connected to the reflective surface portion adjacent thereto and perpendicular to the incidence direction of the other portion of light in relation to the transmitting surface portion.

In the invention according to the third aspect, as a result of the reflective surface portion and the transmitting surface portion being connected, the light separating section can be composed of only optically required surfaces. Therefore, when the optical receptacle is resin-molded using a mold, the contact area between the light separating section and the mold can be reduced, and favorable releasability can be ensured. In addition, the dimension of the light separating section in the transmission direction of the light to be coupled with the end face of the optical fiber can be shortened.

Still further, an optical receptacle according to a fourth aspect of the present invention is the optical receptacle according to the first aspect in which, further, the segmentation direction is a direction perpendicular to the slope direction and a normal direction of the segmented reflective surface. The segmented reflective surface is composed of a plurality of reflective surface portions that are elongated in the slope direction. The segmented transmitting surface is composed of a plurality of transmitting surface portions that are elongated in a direction perpendicular to the first surface and disposed such as to be perpendicular to the incidence direction of the other portion of light. A stepped surface is formed between the transmitting surface portion and the reflective surface portion adjacent thereto, along the incidence direction of the light of the light-emitting element in relation to the light separating section.

In the invention according to the fourth aspect, the plurality of reflective surface portions can be dispose don the same plane, and the plurality of transmitting surface portions can be disposed on the same plane. Therefore, design is facilitated. In addition, as a result of the stepped surface being formed in a shape parallel with the optical path, the effect of the stepped surface on optical performance can be minimized.

In addition, an optical receptacle according to a fifth aspect of the present invention is the optical receptacle according to any one of the second to fourth aspects in which, further, the second slope angle is an angle such that the portion of light that has been reflected by the reflective surface is incident at an angle of incidence greater than the critical angle.

In the invention according to the fifth aspect, the segmented reflective surface can be formed into a total reflection surface. Therefore, the segmented reflective surface can be easily configured by only the sloped surface of the optical receptacle. Thus, the number of components can be reduced.

Furthermore, an optical receptacle according to a sixth aspect of the present invention is the optical receptacle according to any one of the second to fifth aspects in which, further, the plurality of transmitting surface portions are formed having the same width as one another in a direction perpendicular to a length direction and such as to be evenly spaced in the segmentation direction.

In the invention according to the sixth aspect, the design of the light separating section can be simplified, and the stability of optical coupling efficiency can be improved.

Still further, an optical receptacle according to a seventh aspect of the present invention is the optical receptacle according to any one of the second to sixth aspects in which, further, a first lens face is formed on the first surface, the first lens face enabling the light of the light-emitting element to be incident towards the reflective surface. A second lens face is formed on the third surface, the second lens face emitting the light to be coupled with the end face of the optical fiber towards the end face of the optical fiber.

In the invention according to the seventh aspect, as a result of the first lens face and the second lens face, optical coupling of the light-emitting element and the end face of the optical fiber can be efficiently performed.

In addition, an optical receptacle according to an eighth aspect of the present invention is the optical receptacle according to the seventh aspect in which, further, as the photoelectric conversion device, a photoelectric conversion device is disposed in which a plurality of light-emitting elements are arrayed along a length direction of the reflective surface portion. The optical fiber is disposed such that a plurality thereof are arrayed along the length direction of the reflective surface portion. The first lens face and the second lens face are respectively formed such that a plurality thereof are arrayed along the length direction of the reflective surface portion.

In the invention according to the eighth aspect, multi-channel optical transmission accompanying monitoring in which the light of the light-emitting element is extracted along the substrate at the end face of the optical fiber can be easily and appropriately actualized.

Furthermore, an optical receptacle according to a ninth aspect of the present invention is the optical receptacle according to the eighth aspect in which, further, a third lens face is formed on the first surface, the third lens face emitting the monitor light towards the light-receiving element.

In the invention according to the ninth aspect, the monitor light can be more efficiently coupled with the light-receiving element.

Still further, an optical receptacle according to a tenth aspect of the present invention is the optical receptacle according to any one of the first to ninth aspects in which, further, the first surface advances the light of the light-emitting element towards the reflective surface as collimated light.

In the invention according to the tenth aspect, even when a dimensional error in the advancing direction of light occurs in the optical receptacle, the effect on optical performance can be reduced. Therefore, dimensional accuracy can be relaxed.

In addition, an optical receptacle according to an eleventh aspect of the present invention is the optical receptacle according to any one of the first to ninth aspects in which, further, the first surface advances the light of the light-emitting element towards the reflective surface as light of which a light beam diameter changes as the light advances forward in an advancing direction.

In the invention according to the eleventh aspect, the intensity distribution of the coupled light at the end face of the optical fiber can be formed into a shape that is almost similar to that of the intensity distribution of the light of the light-emitting element before separation by the light separating section. Therefore, the tolerance curve of coupling efficiency can be made equal to that of an optical system in which the monitor light is not separated. As a result, deterioration of the light that is incident on the optical fiber can be prevented even when the monitor light is separated. In addition, decrease in coupling efficiency due to positional misalignment of the optical fiber in the radial direction can be further effectively reduced.

Furthermore, an optical receptacle according to a twelfth aspect of the present invention is the optical receptacle according to the eleventh aspect in which, further, the first surface advances the light of the light-emitting element as light of which the light beam diameter gradually increases as the light advances forward in the advancing direction.

In the invention according to the twelfth aspect, the area occupancy rate of foreign matter or a scratch in relation to a light spot on the second surface can be reduced. Therefore, the effect of foreign matter or a scratch on the second surface on coupling efficiency can be effectively reduced.

Furthermore, an optical receptacle according to a thirteenth aspect of the present invention is the optical receptacle according to the eleventh aspect in which, further, the first surface advances the light of the light-emitting element as light of which the light beam diameter gradually decreased as the light advances forward in the advancing direction.

In the invention according to the thirteenth aspect, the light of the light-emitting element can be effectively converged before arrival at the second surface. Therefore, it is not necessary to give the second surface a large power. As a result, the shape of the second surface can be simplified and cost can be reduced.

An optical module according to a fourteenth aspect of the present invention includes an optical receptacle according to any one of the first to thirteenth aspects and a photoelectric conversion device according to the first or eighth aspect.

In the invention according to the fourteenth aspect, optical transmission accompanying monitoring can be appropriately performed. In addition, positional accuracy of the optical fiber in relation to the optical receptacle can be relaxed.

Effect of the Invention

In the present invention, optical transmission accompanying monitoring in which the light from the light-emitting element is extracted in a direction along the substrate at the end face of the optical fiber can be easily and appropriately actualized.

BRIEF DESCRIPTION OF DRAWINGS

FIG. 23 A schematic configuration diagram of a third variation example according to the fourth embodiment.

BEST MODE(S) FOR CARRYING OUT THE INVENTION

First Embodiment

A first embodiment of an optical receptacle and an optical module including the optical receptacle of the present invention will hereinafter be described with reference to FIG. 1 to FIG. 11.

Figure 1:
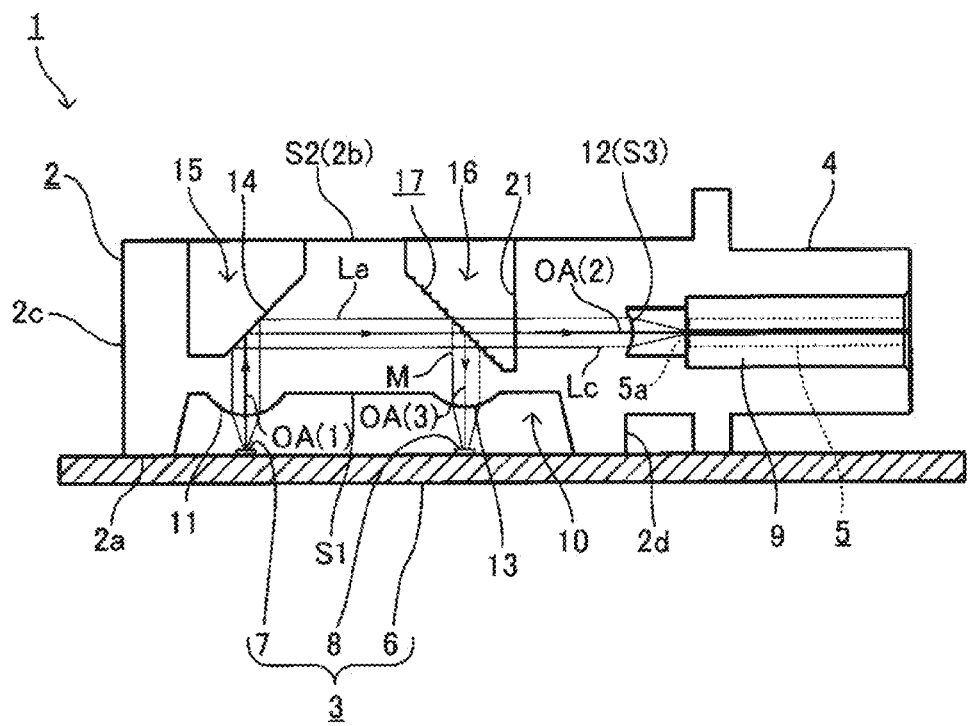
FIG. 1 A schematic configuration diagram of an optical receptacle and an optical module according to a first embodiment of the present invention.
Figure 2:
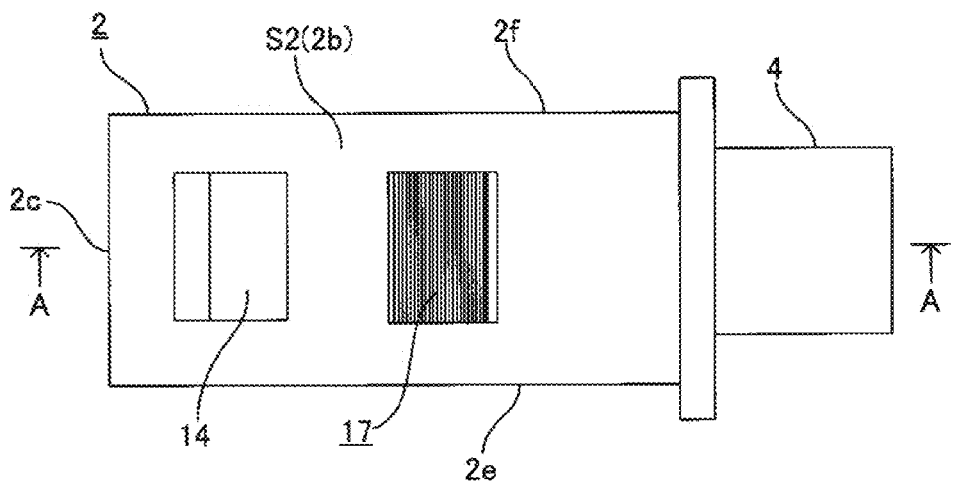
FIG. 2 A planar view of the optical receptacle shown in FIG. 1.
Figure 3:
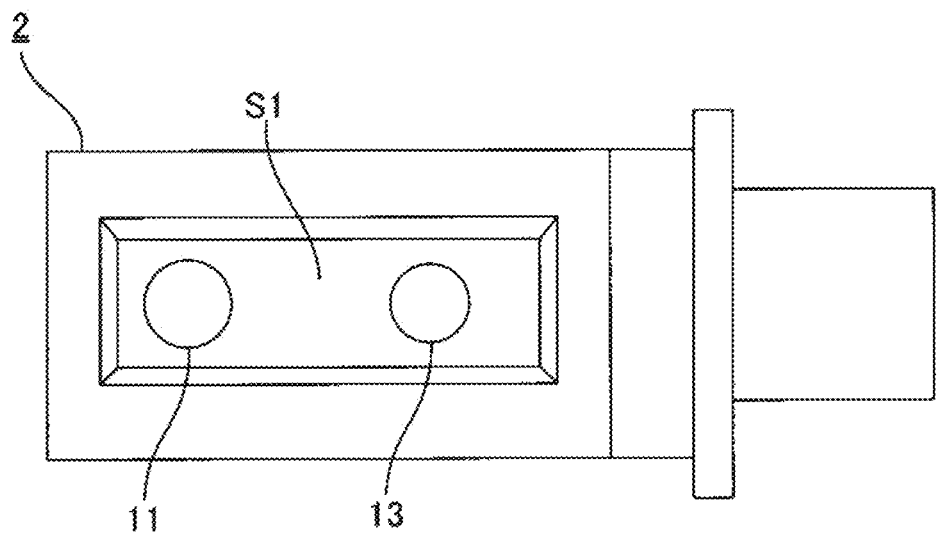
FIG. 3 A bottom view of the optical receptacle shown in FIG. 1.

FIG. 1 is a schematic configuration diagram showing an overview of an optical module 1 according to the first embodiment together with a vertical cross-sectional view (equivalent to a cross-sectional view taken along line A-A in FIG. 2) of an optical receptacle 2 according to the first embodiment. In addition, FIG. 2 is a planar view of the optical receptacle 2 shown in FIG. 1. Furthermore, FIG. 3 is a bottom view of the optical receptacle 2 shown in FIG. 1.

As shown in FIG. 1, the optical receptacle 2 (optical receptacle main body) according to the first embodiment is disposed between a photoelectric conversion device 3 and an optical fiber 5.

Here, the photoelectric conversion device 3 in FIG. 1 is a substrate-mounted photoelectric conversion device 3. In other words, as shown in FIG. 1, the photoelectric conversion device 3 has a single light-emitting element 7 on a surface (top surface) of a semiconductor substrate (circuit board) 6 on the optical receptacle 2 side, the light-emitting element 7 emitting a laser light La in a direction perpendicular to this surface (upwards). The semiconductor substrate 6 is disposed in parallel with a lower end surface 2a of the optical receptacle 2. The light-emitting element 7 configures the above-described VCSEL. In addition, the photoelectric conversion device 3 has a single light-receiving element 8 on the surface of the semiconductor substrate 6 on the optical receptacle 2 side, in a position to the right of the light-emitting element 7 in FIG. 1, the light-receiving element 8 receiving a monitor light M for monitoring output (such as intensity and amount of light) of the laser light La emitted from the light-emitting element 7. The light-receiving element 8 may be a photodetector. Furthermore, electronic components, such as a control circuit that controls the output of the laser light La emitted from the light-emitting element 7 based on the intensity and the amount of light of the monitor M received by the light-receiving element 8, are mounted on the surface of the semiconductor substrate 6 on the optical receptacle 2 side (not shown). The electronic components are electrically connected to the light-emitting element 7 and the light-receiving element 8 by wires. The photoelectric conversion device 3 such as this, together with the optical receptacle 2, configures the optical module 1 by, for example, the photoelectric conversion device 3 being attached to the optical receptacle 2 by a known fixing means, such as an adhesive (for example, a thermoset or ultra-violet hardening resin) disposed between the semiconductor substrate 6 and the optical receptacle 2.

In addition, as shown in FIG. 1, a section of the optical fiber 5 on an end face 5a side that has a predetermined length is detachably attached, together with a circular-cylindrical ferrule 9 that holds this section, in a cylindrical optical fiber attaching section 4 that is formed in the optical receptacle 2. In this attached state, the section of the optical fiber 5 on the end face 5a side (the section housed within the optical fiber attaching section 4) is parallel with the semiconductor substrate 6. The optical fiber 5 may be either a single-mode optical fiber or a multi-mode optical fiber.

In a state in which the optical receptacle 2 is disposed between the photoelectric conversion device 3 and the optical fiber 5 such as those described above, the optical receptacle 2 optically couples the light-emitting element 7 and the end face 5a of the optical fiber 5.

The optical receptacle 2 will be described in further detail. As shown in FIG. 1, the outer shape of a main section of the optical receptacle 2 having various optical surfaces is formed into a substantially rectangular parallelepiped shape. In other words, as shown in FIG. 1 to FIG. 3, the main section of the optical receptacle 2 configures an overall outer shape by the lower end surface 2a, an upper end surface 2b, a left end surface 2c, a right end surface 2d, a front end surface 2e, and a rear end surface 2f. The upper and lower end surfaces 2a and 2b are parallel with each other. The left and right end surfaces 2c and 2d are also parallel with each other. Furthermore, the upper and lower end surfaces 2a and 2b and the left and right end surfaces 2c and 2d are perpendicular to each other. The above-described optical fiber attaching section 4 is formed such as to extend towards the right side from the right end face 2d. However, the present invention is not necessarily limited to a configuration such as this. For example, when the optical receptacle 2 is formed by resin-molding, release tapers may be formed in the left and right end surfaces 2c and 2d for release from the mold.

As shown in FIG. 1, a first recessing section 10 is formed on the lower end surface 2a of the optical receptacle 2, the first recessing section 10 having a substantially trapezoidal cross-sectional shape that recesses upwards in relation to the lower end surface 2a. An inner bottom surface of the first recessing section 10 is a first surface S1 on which the laser light La from the light-emitting element 7 is incident and from which the monitor light M is emitted towards the light-receiving element 8. As shown in FIG. 1, the first surface S1 is formed in parallel with the lower end surface 2a. In a position near the left end portion in FIG. 1 and FIG. 3 on the first surface S1, such as that described above, a single first lens face 11 is formed as shown in FIG. 1 and FIG. 3. As shown in FIG. 1 and FIG. 3, the first lens face 11 is formed having a circular planar shape, and is formed into a spherical or aspherical convex lens face of which the convex surface faces the light-emitting element 7 side. An optical axis OA(1) on the first lens face 11 preferably matches a center axis (central ray) of the laser light La (light beam) emitted from the light-emitting element 7. In addition, the axial direction of the optical axis OA(1) may be perpendicular to the first surface S1.

As shown in FIG. 1, in a state in which the photoelectric conversion device 3 is attached to the optical receptacle 2, the laser light La emitted from the light-emitting element 7 is incident on the first lens face 11, such as that described above, from below. Then, the first lens face 11 collimates the incident laser light La and advances the laser light La into the interior of the optical receptacle 2.

In addition, as shown in FIG. 1 and FIG. 2, the upper end surface 2b of the optical receptacle 2 is a second surface S2 on the side opposite to (above in FIG. 1) the first surface S1. A reflective surface 14 is formed in a position on the second surface S2 on the incidence direction side of the laser light La in relation to the first lens face 11 (a position directly above in FIG. 1), the reflective surface 14 having a predetermined first slope angle in relation to the first surface S1, such as to slope towards the right side as the first reflective surface 14 extends upwards. As shown in FIG. 1, the reflective surface 14 is composed of only an inner sloped surface of a second recessing section 15 that has a substantially trapezoidal cross-sectional shape formed recessing downwards on the upper end surface 2b.

As shown in FIG. 1, the laser light La of the light-emitting element 7 that has been incident on the first lens face 11 is incident (internally incident) on the reflective surface 14, such as that described above, from the interior of the optical receptacle 2, at an angle of incidence that is greater than the critical angle from below in FIG. 1. The reflective surface 14 then totally reflects the incident laser light La of the light-emitting element 7 towards the right side in FIG. 1.

In terms of simplifying design and dimensional accuracy measurement, the slope angle of the first reflective surface 14 may be 45° in the counter-clockwise direction in FIG. 1 with reference to the first surface S1 (0°).

Furthermore, as shown in FIG. 1 and FIG. 2, a third recessing section 16 is formed in a recessing manner in a position on the second surface S2 on the reflection direction side of the laser light La of the light-emitting element 7 in relation to the reflective surface 14 (a position on the right side), the third recessing section 16 having a substantially trapezoidal cross-sectional shape that recesses downwards.

A section of the inner surface of the third recessing section 16 that faces the reflective surface 14 (a section having a slope) is a light separating section 17. The laser light La of the light-emitting element 7 that has been reflected by the reflective surface 14 is incident on the light separating section 17 from the interior of the optical receptacle 2. The light separating section 17 then separates the incident laser light La of the light-emitting element 7 into the monitor light M that advances towards the first surface S1 and light Lc to be coupled with the end face 5a of the optical fiber 5 (referred to, hereinafter, as fiber coupled light).

Still further, as shown in FIG. 1, a single second lens face 12 that also serves as a third surface S3 is formed in a position on the right end surface 2d of the optical receptacle 2 facing the end face 5a of the optical fiber 5. In a manner similar to the first lens face 11, the second lens face 12 is formed having a circular planar shape, and is formed into a spherical or aspherical convex lens face of which the convex surface faces the side of the end face 5a of the optical fiber 5. An optical axis OA(2) on the second lens face 12 preferably matches the center axis of the end face 5a of the optical fiber 5.

As shown in FIG. 1, the fiber coupled light Lc that has been separated from the monitor light M by the light separating section 17 is incident on the second lens face 12, such as that described above, from the interior of the optical receptacle 2. The second lens face 12 then converges the incident fiber coupled light Lc and emits the fiber coupled light Lc towards the end face 5a of the optical fiber 5.

Figure 4:
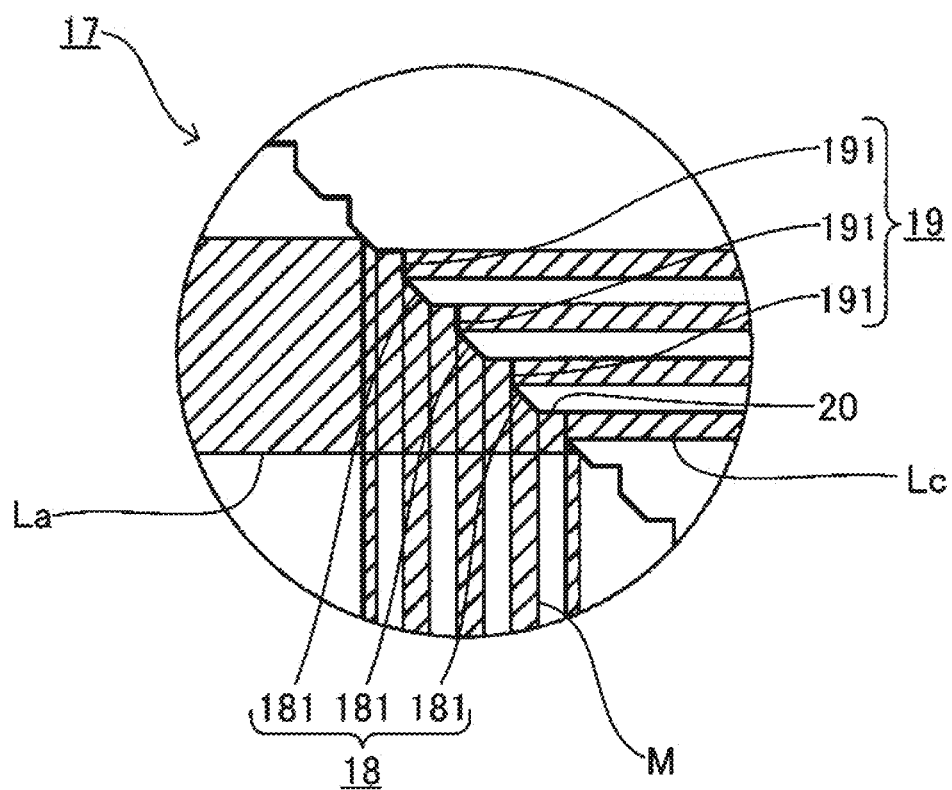
FIG. 4 An enlarged cross-sectional view of the main sections of a light separating section according to the first embodiment.

Here, the light separating section 17 will be described in detail. As shown in FIG. 4, the light separating section 17 is configured by three surfaces being combined, the three surfaces being a segmented reflective surface 18, a segmented transmitting surface 19, and a stepped surface 20.

Specifically, as shown in FIG. 4, the segmented reflective surface 18 has a predetermined second slope angle in relation to the first surface S1, such as to slope towards the first surface S1 side (downward in FIG. 4) as the segmented reflective surface 18 extends towards the second lens face 12 (third surface S3) side (the right side in FIG. 4). In addition, as shown in FIG. 4, the segmented reflective surface 18 is disposed in a segmented manner, evenly spaced in the slope direction (second slope angle direction) of the segmented reflective surface 18, serving as a predetermined segmentation direction. More specifically, the segmented reflective surface 18 is composed of a plurality of band-shaped reflective surface portions 181 that are elongated in a direction perpendicular to the slope direction and the normal direction of the segmented reflective surface 18 (a direction perpendicular to the surface of the paper on which FIG. 4 is printed in FIG. 4). The reflective surface portions 181 are disposed, as a whole, on the same slope plane having the second slope angle. The second slope angle may be 45° in the clockwise direction in FIG. 1 with reference to the first surface S1 (0°).

On the other hand, as shown in FIG. 4, the segmented transmitting surface 19 is disposed in a segmented manner such as to be positioned in non-placement areas of the segmented reflective surface 18 (mainly in the gap portions between the reflective surface portions 181). In addition, the segmented transmitting surface 19 is disposed such as to directly oppose the reflection direction of the laser light La of the light-emitting element 7 in relation to the reflective surface. More specifically, the segmented transmitting surface 19 is composed of a plurality of band-shaped transmitting surface portions 191 that are elongated along the length direction of the reflective surface portions 181 (the direction perpendicular to the surface of the paper on which FIG. 4 is printed in FIG. 4). Each transmitting surface portion 191 is connected to the reflective surface portion 181 that is adjacent thereto on the first surface S1 side and is disposed such as to be perpendicular to the incidence direction of the laser light La in relation to the transmitting surface portion 191. Each transmitting surface portion 191 may be disposed such as to be perpendicular to the first surface S1.

In addition, as shown in FIG. 4, the stepped surface 20 is formed between the transmitting surface portion 191 and the reflective surface portion 18 adjacent thereto on the second surface S2 side, such as to be parallel with the incidence direction of the laser light La of the light-emitting element in relation to the light separating section 17.

Of the laser light La of the light-emitting element 7 that has been reflected by the reflective surface 14, a portion of the laser light La is incident on the segmented reflective surface 18 of the light separating section 17, configured as described above, at an angle of incidence greater than the critical angle. Another portion of laser light La other than the portion of laser light La is perpendicularly incident on the segmented transmitting surface 19 of the light separating section 17.

Then, the portion of the laser light La that has been incident on the segmented reflective surface 18 is totally reflected towards the first surface S1 side by the segmented reflective surface 18 as monitor light.

On the other hand, the other portion of the laser light La that has been incident on the segmented transmitting surface 19 is perpendicularly transmitted towards the second lens face 12 side by the segmented transmitting surface 19 as the fiber coupled light Lc. At this time, because the laser light La is perpendicularly transmitted, refraction of the fiber coupled light Lc does not occur.

In addition, at this time, the stepped surface 20 is formed in parallel with the incidence direction of the laser light La. Therefore, the laser light La is not incident on the stepped surface 20.

Returning to FIG. 1 and FIG. 2, a section of the inner surface of the third recessing section 16 that opposes the light separating section 17 with the space (an air layer) within the recessing section 16 therebetween (right inner surface) is a transmitting surface 21. The fiber coupled light Lc that has been separated by the light separating section 17 is perpendicularly incident on the transmitting surface 21 after passing through the space within the third recessing section 16. The transmitting surface 21 then perpendicularly transmits the incident fiber coupled light Lc towards the second lens face 12. At this time, because the fiber coupled light Lc is perpendicularly transmitted, refraction of the fiber coupled light Lc does not occur.

In addition, as shown in FIG. 1 and FIG. 3, a single third lens face 13 is formed in a position on the first surface S1 near the right end portion in FIG. 1 and FIG. 3. As shown in FIG. 1 and FIG. 3, in a manner similar to the first lens face 11, the third lens face 13 is formed having a circular planar shape, and is formed into a spherical or aspherical convex lens face of which the convex surface faces the side of the light-receiving element 8 side. The axial direction of an optical axis OA(3) on the third lens face 13 may be perpendicular to the first surface S1.

As shown in FIG. 1, the monitor light M that has been totally reflected by the segmented reflective surface 18 is incident on the third lens face 13, such as that described above, from the interior of the optical receptacle 2. The third lens face 13 then converges the internally incident monitor light M and emits the monitor light M towards the light-receiving element 8.

In the configuration described above, the laser light La of the light-emitting element 7 that has been incident on the first surface S1 is reflected by the reflective surface 14. The laser light La is then separated into the monitor light M and the fiber coupled light Lc as a result of reflection by the segmented reflective surface 18 of the light separating section 17 and transmittance by the segmented transmitting surface 19 of the light separating section 17. The monitor light M is emitted from the first surface S1 towards the light-receiving element 8 side. The fiber coupled light Lc is emitted from the third surface S3 towards the side of the end face 5a of the optical fiber 5. Therefore, acquiring the monitor light M and extracting the fiber coupled light Lc in the direction along the substrate 6 at the end face 5a of the optical fiber 5 can be easily performed.

Figure 5:
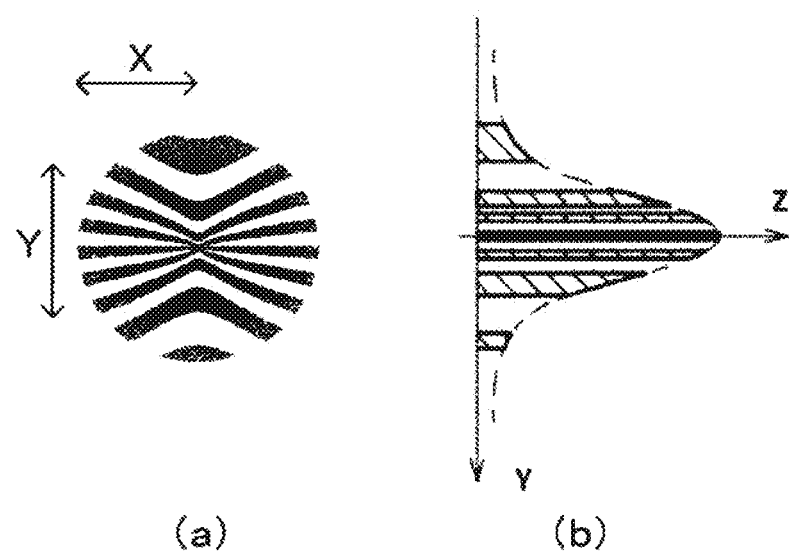
FIG. 5(a): A diagram of the spot shape of fiber coupled light on an end face of an optical fiber.
5(b): A diagram of the intensity distribution of the fiber coupled light on the end face of the optical fiber according to the first embodiment.

In addition, at this time, because the segmented transmitting surface 19 is disposed in a segmented manner, as shown in FIG. 5(*a*), the overall shape of the fiber coupled light Lc at a cross-section perpendicular to the advancing direction can be made similar to a circular shape. The cross-sectional shape of the fiber coupled light Lc in FIG. 5(*a*) is the spot shape on the end face 5a of the optical fiber 5. The X-axis direction in FIG. 5(*a*) indicates a length direction of the reflective surface portion 181 in the radial direction of the end face 5a of the optical fiber 5. In addition, the Y-axis direction in FIG. 5(*a*) indicates a direction perpendicular to the length direction of the reflective surface portion 181 in the radial direction of the end face 5a of the optical fiber 5. FIG. 5(*b*) shows the intensity distribution of the fiber coupled light Lc on an YX plane assumed on the end face 5a of the optical fiber 5. The Z-axis direction in FIG. 5(*b*) indicates the normal direction (in other words, the incidence direction of the fiber coupled light Lc) of the end face 5a. As a result of the fiber coupled light Lc such as this being obtained, significant decrease in optical coupling efficiency can be prevented even when positional misalignment of a certain extent occurs in the radial direction of the optical fiber 5. Therefore, optical transmission accompanying monitoring can be appropriately performed. In addition, because appropriate optical transmission such as this is ensured, positional accuracy of the optical fiber 5 in relation to the optical receptacle 2 can be relaxed.

Furthermore, in the configuration according to the first embodiment, the segmented reflective surface 18 is disposed on the same plane. Therefore, when the optical receptacle 2 is resin-molded using an a mold for injection molding, during the molding process, shape transfer surfaces of the segmented transmitting surface 19 and the stepped surface 20 may be formed between the shape transfer surfaces of the segmented reflective surface 18 by groove processing of grooves that are elongated to the front and rear (above and below in FIG. 2) using a tool (such as a cutting tool). As a result, a mold having favorable dimensional accuracy can be easily and quickly acquired at low cost. In addition, as a result of the stepped surface 20, which is unavoidable in such instances, being formed in parallel with the optical path, the effect of the stepped surface 20 on optical performance can be minimized.

Still further, as a result of the first lens face 11 and the second lens face 12, optical coupling of the light-emitting element 7 and the end face 5a of the optical fiber 5 can be efficiently performed. In addition, as a result of the third lens face 13, the monitor light M can be efficiently coupled with the light-receiving element 8.

In addition, the first lens face 11 is formed such that the incident light La is converted to collimated light (parallel light) having a fixed light beam diameter. Therefore, only the collimated light need be handled within the optical receptacle 2. As a result, even when a dimensional error occurs in the advancing directions of the collimated lights La, Lc, and M in the optical receptacle 2, the amount of light coupled with the end face 5a of the optical fiber 5 and with the light-receiving element 8 (in other words, coupling efficiency) and the positions of the light-collecting points for incident light on the optical fiber 5 and on the light-receiving element 8 can be appropriately ensured. As a result, dimensional accuracy of the optical receptacle 2 can be relaxed and ease of manufacturing can be improved, while maintaining optical performance.

A reflective film configured by a thin film or the like that is composed of a metal (such as Al, Ag, or Au) having high light reflectance may be formed, as required, on the reflective surface 14 and the segmented reflective surface 18. However, when reduction of the number of components is prioritized, a configuration is preferably used that uses only total reflection, as described above.

In addition, from the perspective of simplifying design and improving the stability of optical coupling efficiency, the transmitting surface portions 191 are preferably formed having the same width as one another in the direction perpendicular to the length direction and are formed such as to be evenly spaced in the segmentation direction.

Variation Example

Next, a variation example according to the first embodiment will be described with reference to FIG. 6 to FIG. 9.

The optical module 1 and the optical receptacle 2 in the variation example are a lens-array type. The optical module 1 and the optical receptacle 2 include the main configurations of the optical module 1 and the optical receptacle 2 shown in FIG. 1 to FIG. 5, and supports multi-channeling of optical transmission accompanying monitoring.

Figure 6:
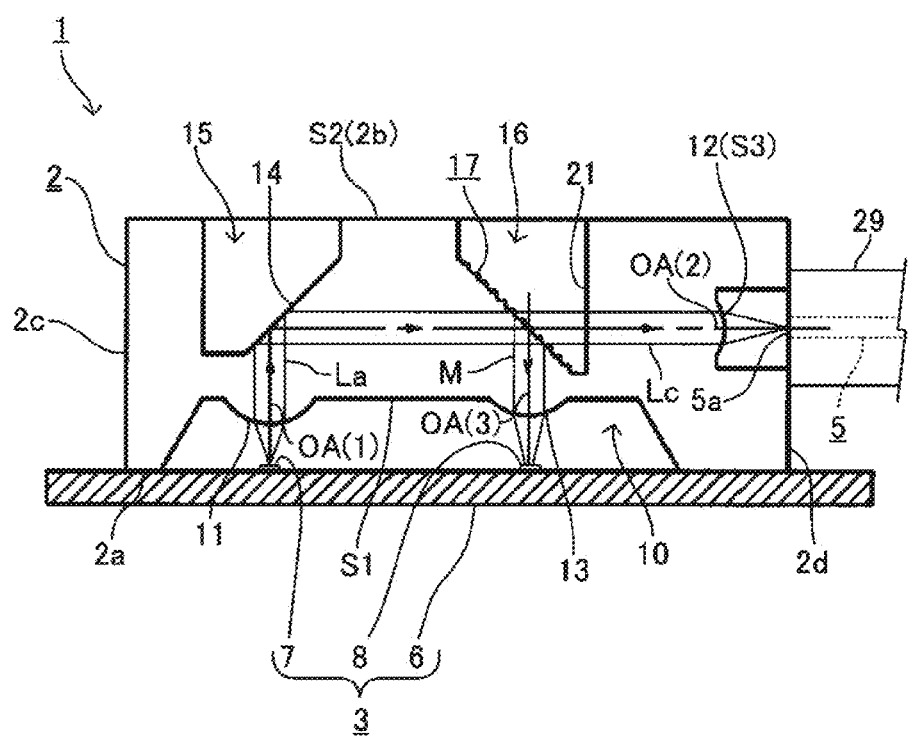
FIG. 6 A schematic configuration diagram of a variation example according to the first embodiment.
Figure 7:
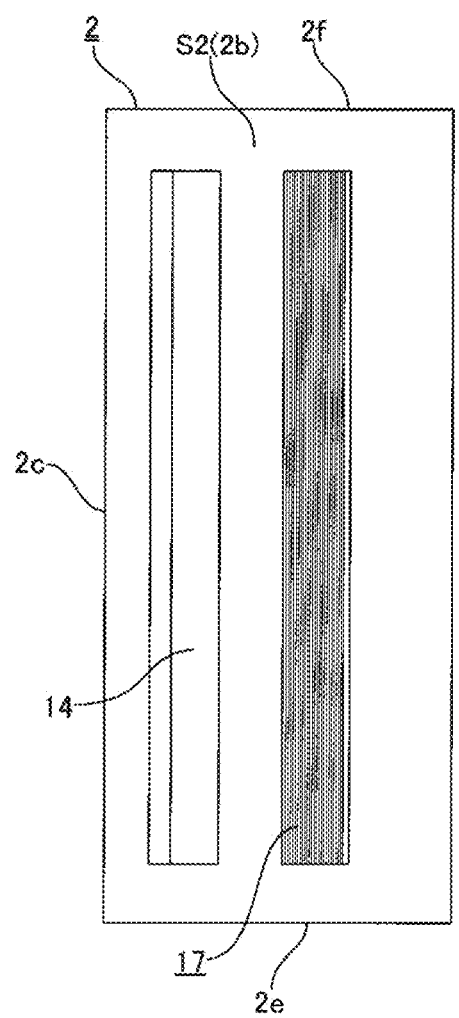
FIG. 7 A planar view of the optical receptacle shown in FIG. 6.
Figure 8:
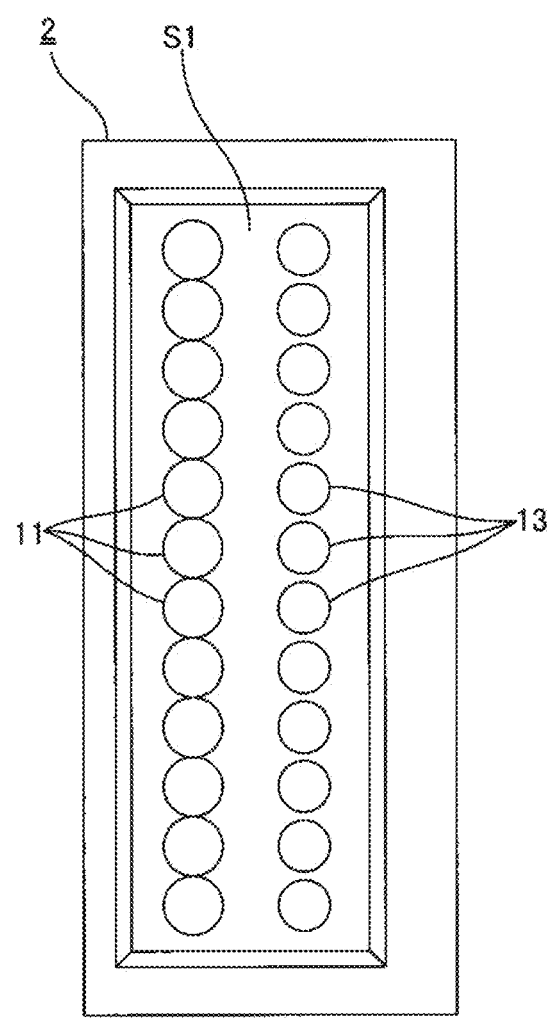
FIG. 8 A bottom view of the optical receptacle shown in FIG. 6.
Figure 9:
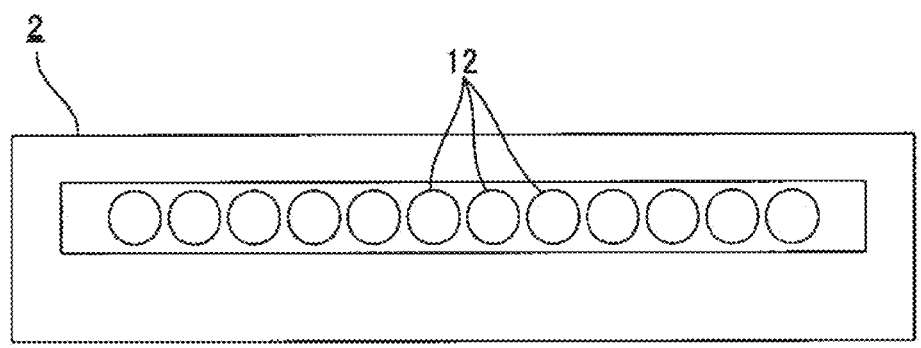
FIG. 9 A right-side view of the optical receptacle shown in FIG. 6.
Figure 10:
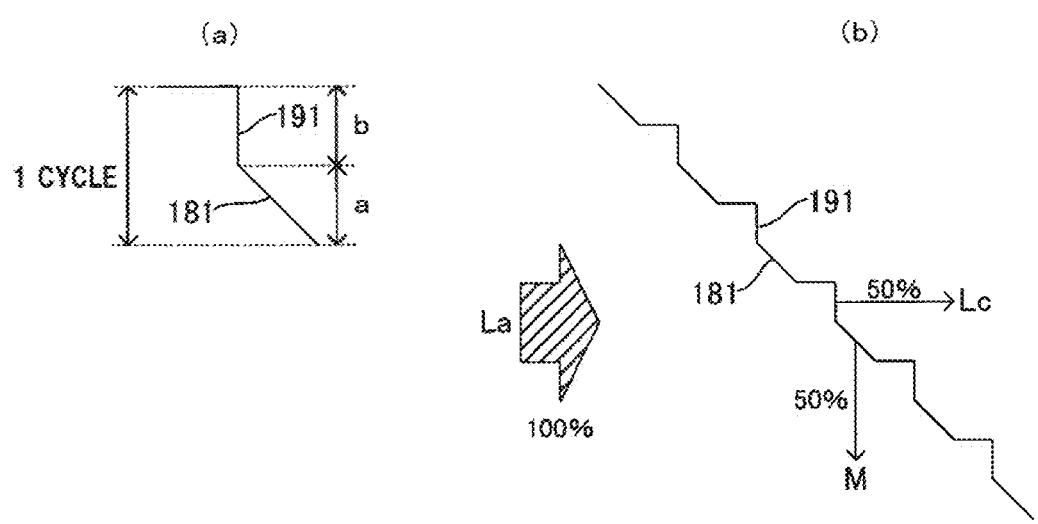
FIG. 10 A diagram of a first specific configuration example in an example according to the first embodiment.
Figure 11:
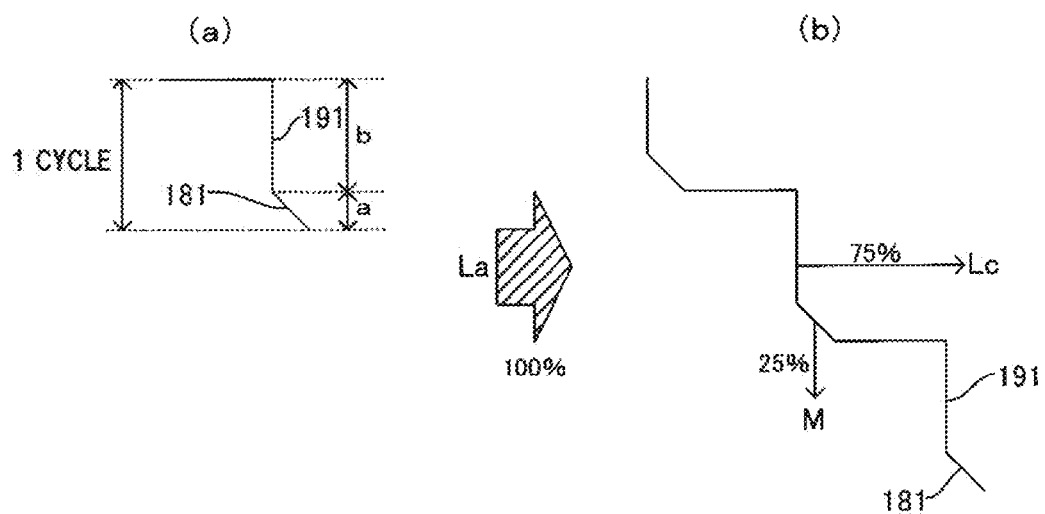
FIG. 11 A diagram of a second specific configuration example in the example according to the first embodiment.

In other words, in the variation example, in the photoelectric conversion device 3, a plurality (twelve) of light-emitting elements 7 and a plurality (twelve) of light-receiving elements 8 are formed in an array along the direction perpendicular to the surface of the paper on which FIG. 6 is printed. In addition, in the variation example, optical fibers 5 are disposed in an array along a direction that is the same as the array direction of the light-emitting elements 7 and the light-receiving elements 8. The number of optical fibers 5 is the same as the number of light-emitting elements 7 and light-receiving elements 8. In FIG. 6, the optical fibers 5 are attached to the optical receptacle 2 by a known attaching means, in a state in which the optical fibers 5 are housed within a multi-core integrated connector 29.

Based on the configurations of the photoelectric conversion device 3 and the optical fibers 5 such as those described above, the optical receptacle 2 is formed such that the dimension in the direction perpendicular to the surface of the paper on which FIG. 6 is printed is greater than that of the basic configuration, such that the optical path between each light-emitting element 7 and each optical fiber 5 and the optical path between each light-emitting element 7 and each light-receiving element 8 can be formed. Specifically, the first surface S1 to third surface S3, the reflective surface 14, and the light separating section 17 are formed such as to be large in the length direction of the paper on which FIG. 6 is printed, such that the optical path of the laser light La for each light-emitting element 7 can be formed. In addition, first lens faces 11 to third lens faces 13 are formed in positions respectively corresponding to the light-emitting elements 7, the end faces 5a of the optical fibers 5, and the light-receiving elements 8. The number of each first lens face 11 to third lens face 13 is the same as the number of light-emitting elements 7, optical fibers 5, and light-receiving elements 8.

In the variation example, the laser light La of each light-emitting element 7 can be separated by the light separating section 17 into the fiber coupled light Lc and the monitor light M for each light-emitting element 7. A spot shape such as that shown in FIG. 5(a) can be obtained for each fiber coupled light Lc. Therefore, multi-channel optical transmission accompanying monitoring can be easily and appropriately performed.

First Example

Next, two specific configuration examples of the light separating section 17 will be described as examples according to the first embodiment.

First, FIG. 10(a) shows the light separating section 17 in which the reflective surface portions 181 are formed with a slope angle of 45° in the clockwise direction in relation to the first surface S1, and the transmitting surface portions 191 are formed such as to be perpendicular to the first surface S1. In addition, a ratio a:b of dimension a of the reflective surface portion 181 in the direction perpendicular to the first surface S1 and dimension b of the transmitting surface portion 191 in the same direction is formed to be 1:1.

In an instance such as this, as shown in FIG. 10(b), light reflectance and light transmittance can both be 50% for a set of reflective surface portion 181 and transmitting surface portion 191 that are adjacent to each other.

Next, in a manner similar to FIG. 10(a), FIG. 11(a) shows the light separating section 17 in which the reflective surface portions 181 are formed with a slope angle of 45° in the clockwise direction in relation to the first surface S1, and the transmitting surface portions 191 are formed such as to be perpendicular to the first surface S1. In addition, a ratio a:b of dimension a of the reflective surface portion 181 in the direction perpendicular to the first surface S1 and dimension b of the transmitting surface portion 191 in the same direction is formed to be 1:3.

In an instance such as this, as shown in FIG. 11(b), light reflectance can be 25% and light transmittance can be 75% for a set of reflective surface portion 181 and transmitting surface portion 191 that are adjacent to each other.

Second Embodiment

Figure 13:
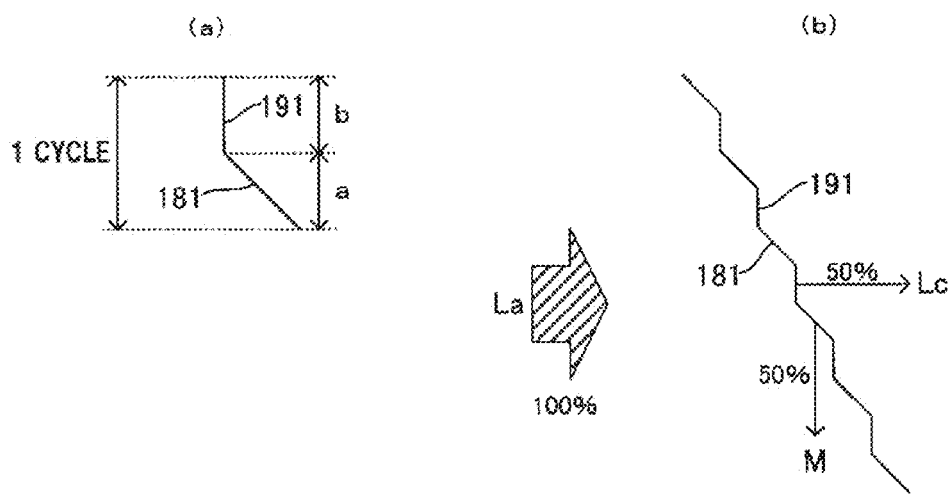
FIG. 13 A diagram of a first specific configuration example in an example according to the second embodiment.
Figure 14:
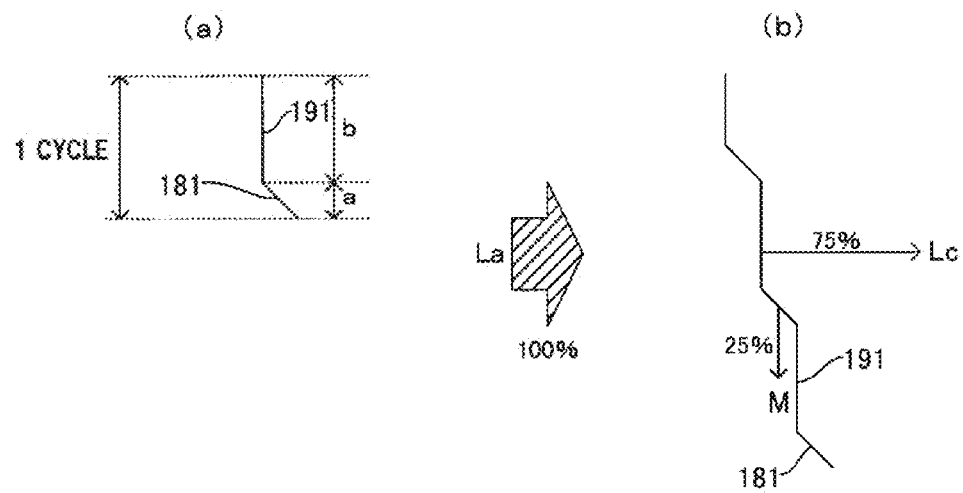
FIG. 14 A diagram of a second specific configuration example in the example according to the second embodiment.

Next, a second embodiment of the optical receptacle and the optical module including the optical receptacle of the present invention will be described with reference to FIG. 12 to FIG. 14, mainly focusing on the differences with the first embodiment.

Figure 12:
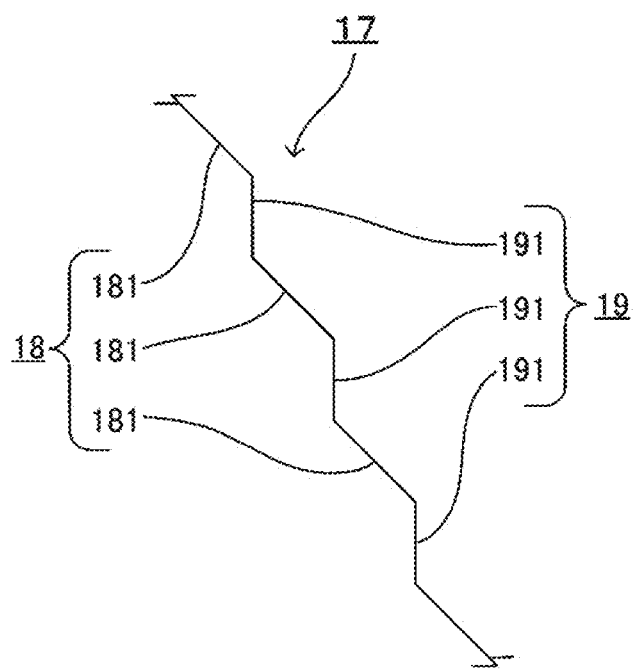
FIG. 12 A configuration diagram of the main sections of an optical receptacle and an optical module according to a second embodiment of the present invention.

As shown in FIG. 12, according to the second embodiment, the segmentation direction of the segmented reflective surface 18 is a direction perpendicular to the first surface S1 (vertical direction in FIG. 12).

In addition, as shown in FIG. 12, according to the second embodiment, the transmitting surface portion 191 is connected to the reflective surface portion 18 adjacent thereto on the first surface S1 side and is also connected to the reflective surface portion 18 adjacent thereto on the second surface S2 side.

Other configurations and applicable variation examples are similar to those according to the first embodiment. Therefore, details thereof are omitted.

According to the second embodiment, as a result of the reflective surface portion 181 and the transmitting surface portion 191 being connected, the light separating section 17 can be composed of only optically required surfaces (the stepped surface 20 according to the first embodiment can be omitted). Therefore, when the optical receptacle 2 is resin-molded using a mold, the contact area between the light separating section 17 and the mold can be reduced, and favorable releasability can be ensured. In addition, the dimension of the light separating section 17 in the transmission direction of the fiber coupled light Lc can be shortened.

Second Example

Next, two specific configuration examples of the light separating section 17 will be described as examples according to the second embodiment.

First, FIG. 13(a) shows the light separating section 17 in which the reflective surface portions 181 are formed with a slope angle of 45° in the clockwise direction in relation to the first surface S1, and the transmitting surface portions 191 are formed such as to be perpendicular to the first surface S1. In addition, a ratio a:b of dimension a of the reflective surface portion 181 in the direction perpendicular to the first surface S1 and dimension b of the transmitting surface portion 191 in the same direction is formed to be 1:1.

In an instance such as this, as shown in FIG. 13(b), light reflectance and light transmittance can both be 50% for a set of reflective surface portion 181 and transmitting surface portion 191 that are adjacent to each other.

Next, in a manner similar to FIG. 13(a), FIG. 14(a) shows the light separating section 17 in which the reflective surface portions 181 are formed with a slope angle of 45° in the clockwise direction in relation to the first surface S1, and the transmitting surface portions 191 are formed such as to be perpendicular to the first surface S1. In addition, a ratio a:b of dimension a of the reflective surface portion 181 in the direction perpendicular to the first surface S1 and dimension b of the transmitting surface portion 191 in the same direction is formed to be 1:3.

In an instance such as this, as shown in FIG. 14(b), light reflectance can be 25% and light transmittance can be 75% for a set of reflective surface portion 181 and transmitting surface portion 191 that are adjacent to each other.

Third Embodiment

Next, a third embodiment of the optical receptacle and the optical module including the optical receptacle of the present invention will be described with reference to FIGS. 15 and 16, mainly focusing on the differences with the first embodiment.

As shown in the vertical cross-sectional view in FIG. 15(a) and the left side view in FIG. 15(b), according to the third embodiment, the segmentation direction of the segmented reflective surface 18 is a direction perpendicular to the slope direction (second slope angle direction) of the segmented reflective surface 18 and the normal direction.

Figure 15:
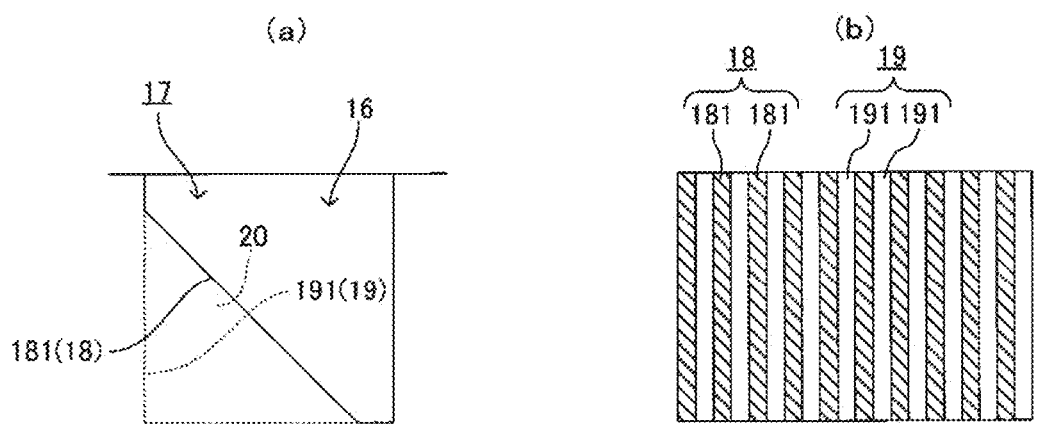
FIG. 15 A configuration diagram of the main sections of an optical receptacle and an optical module according to a third embodiment of the present invention.
Figure 16:
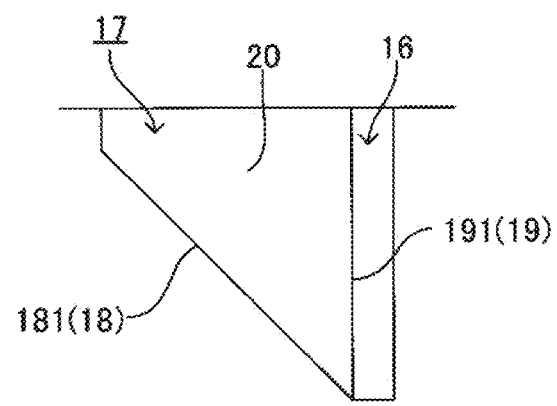
FIG. 16 A configuration diagram of the main sections in a variation example according to the third embodiment.

In addition, as shown in FIG. 15, the segmented reflective surface 18 according to the third embodiment is composed of the plurality of reflective surface portions 181 that are elongated in the slope direction.

Furthermore, as shown in FIG. 15, the segmented transmitting surface 19 is composed of the plurality of transmitting surface portions 191 that are elongated in a direction perpendicular to the first surface S1 and disposed such as to be perpendicular to the incidence direction of the fiber coupled light Lc.

Still further, as shown in FIG. 15, a stepped surface 25 is formed between the transmitting surface portion 191 and the reflective surface portion 181 adjacent thereto, such as to be parallel with the incidence direction of the laser light La of the light-emitting element 7 in relation to the light separating section 17.

In FIG. 15, the segmented transmitting surface 19 is formed in the same position as the left end portion of the segmented reflective surface 18. However, as shown in FIG. 16, the segmented transmitting surface 19 may be formed in the same position as the right end portion of the segmented reflective surface 18.

Other configurations and applicable variation examples are similar to those according to the first embodiment. Therefore, details thereof are omitted.

According to the third embodiment, each reflective surface portion 181 can be disposed on the same sloped plane. In addition, each transmitting surface portion 191 can be disposed on the same vertical plane. Therefore, design is facilitated. In addition, as a result of the stepped surface 25 being formed in parallel with the optical path, the effect of the stepped surface 25 on optical performance can be minimized.

Fourth Embodiment

Next, a fourth embodiment of the optical receptacle and the optical module including the optical receptacle of the present invention will be described with reference to FIG. 17 to FIG. 26, mainly focusing on the differences with the first embodiment.

Figure 17:
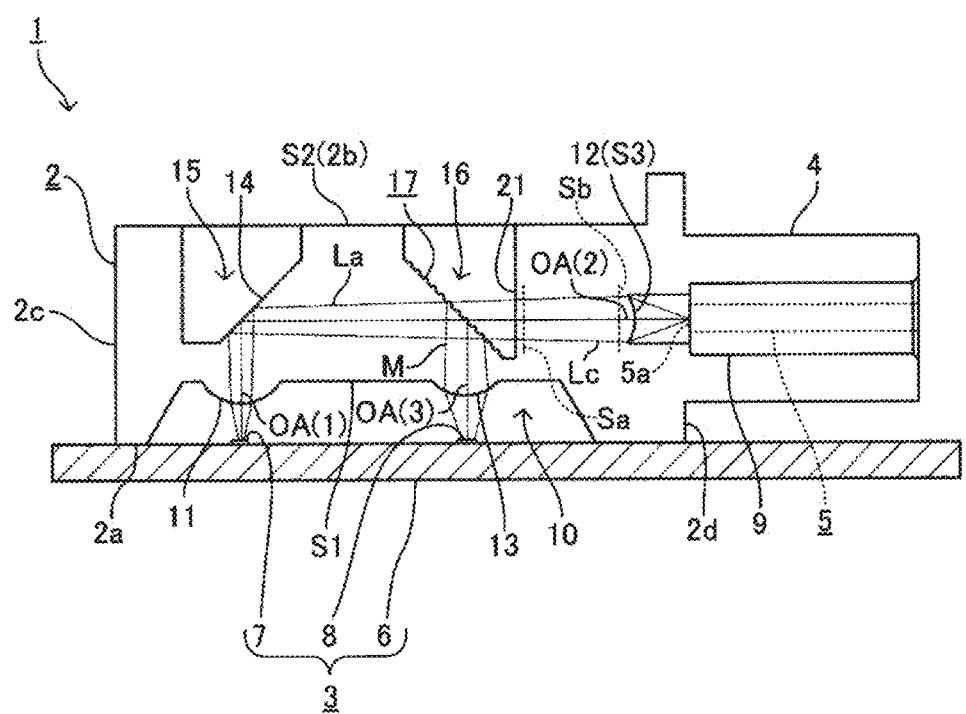
FIG. 17 A configuration diagram of the main sections of an optical receptacle and an optical module according to a fourth embodiment of the present invention.

As shown in FIG. 17, according to the fourth embodiment, instead of the first lens face 11 collimating the laser light La as according to the first embodiment, the laser light La is converged into converged light other than the collimated light and advanced towards the reflective surface 14.

More specifically, in the configuration in FIG. 17, the first lens face 11 converts the laser light La that has arrived from the light-emitting element 7 to converged light of which the light beam diameter gradually increases as the laser light La moves forward in the advancing direction. The configuration according to the fourth embodiment such as this may be actualized, for example, by the positive power of the first lens face 11 being weakened in relation to the configuration according to the first embodiment.

Here, FIG. 18(a) to FIG. 18(c) show simulation results of beam spot shapes of the fiber coupled light Lc in positions differing from one another on the optical path of the fiber coupled light Lc in the configuration according to the fourth embodiment, such as that described above. Specifically, FIG. 18(a) shows the spot shape of the fiber coupled light Lc on a plane Sa assumed on the optical path immediately after the transmitting surface 21 in FIG. 17. In addition, FIG. 18(b) shows the spot shape of the fiber coupled light Lc on a plane Sb assumed on the optical path immediately before the second lens face 12 in FIG. 17. Furthermore, FIG. 18(c) shows the spot shape of the fiber coupled light Lc on the end face 5a of the optical fiber 5.

Figure 18:
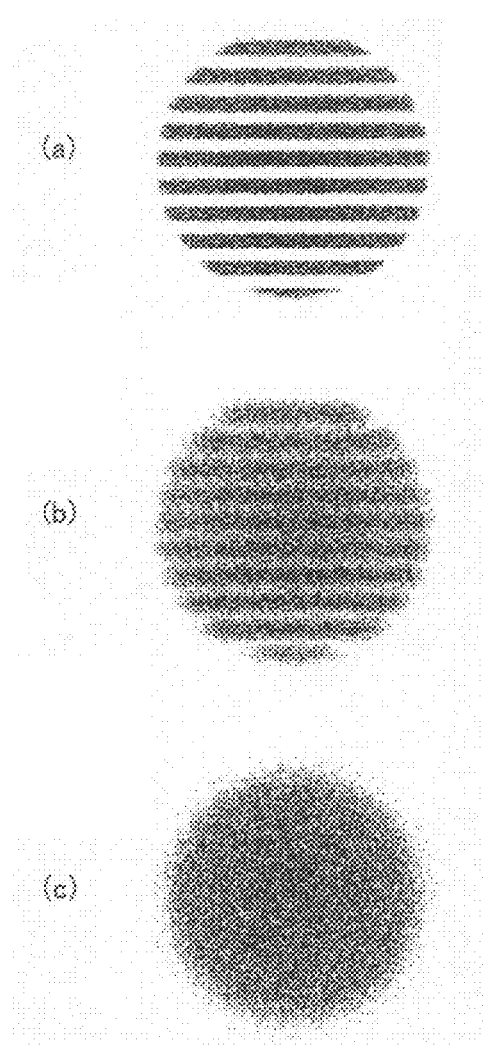
FIG. 18 A simulation diagram of the changes in spot shape (cross-sectional shape) of the fiber coupled light in differing positions on an optical path of the fiber coupled light according to the fourth embodiment.

As shown in FIG. 18, according to the fourth embodiment, the spot shape of the fiber coupled light Lc that is clearly segmented into band shapes immediately after segmentation (FIG. 18(a)) in reflection the segmented transmitting surface 19 deforms such that the space between the bands decrease as the fiber coupled light Lc advances forward (the optical fiber 5 side) (FIG. 18(b)), and ultimately forms a completely unified circular spot with no segmentation on the end face 5a of the optical fiber 5 (FIG. 18(c)). This is caused by the laser light La being converted at the first lens face 11 to converged light (non-collimated light) that increases in diameter as the laser light La advances.

Figure 19:
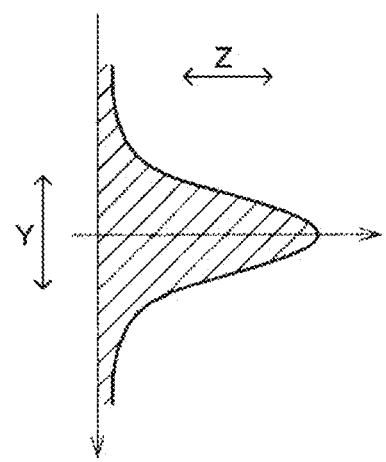
FIG. 19 A diagram of the intensity distribution of fiber coupled light on an end face of an optical fiber according to the fourth embodiment.
Figure 20:
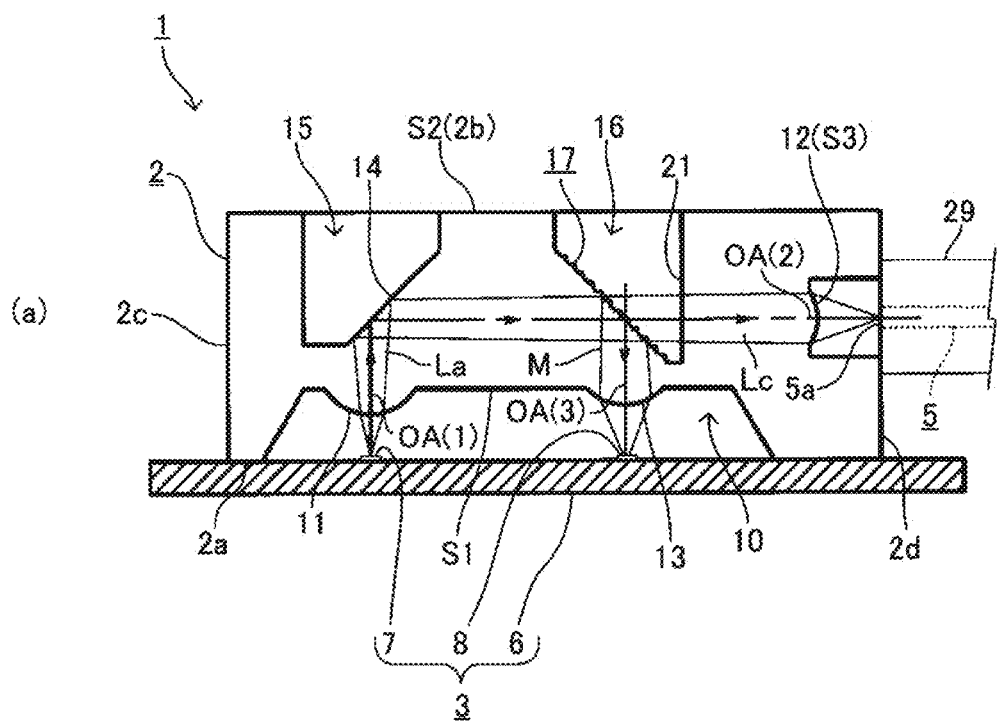
FIG. 20 A schematic configuration diagram of a first variation example according to the fourth embodiment.

In addition, as a result of the non-collimated light such as this being used, according to the fourth embodiment, as shown in FIG. 19, the intensity distribution of the fiber coupled light Lc at the end face 5a of the optical fiber 5 can be formed into a shape such that the intensity gradually decreases from the center axis side (maximum intensity side) towards the periphery. An intensity distribution such as this has a substantially similar shape as that of the intensity distribution of the laser light La before separation by the light separating section 17 (including when the laser light La is emitted from the light-emitting element 7).

In the configuration according to the fourth embodiment such as that described above, compared to that according to the first embodiment, coupling efficiency can be further improved. In addition, decrease in optical coupling efficiency accompanying positional misalignment of the optical fiber 5 in the radial direction can be more effectively reduced. Furthermore, as a result of light intensity being made uniform, radiation loss (bending loss) in instances in which the optical fiber 5 is used in a bent state can be reduced. As a result, optical transmission accompanying monitoring can be more appropriately performed.

In addition, according to the fourth embodiment, the fiber coupled light Lc can be increased in diameter as the fiber coupled light Lc advances. Therefore, even in instances in which foreign matter is deposited or a scratch is formed on the second lens face 12, the area occupancy rate of the foreign matter or scratch in relation to the light spot of the fiber coupled light Lc on the second lens face 12 can be reduced. As a result, the effect of the foreign matter or scratch on the second lens face 12 on coupling efficiency can be effectively reduced.

Various variation examples such as those below may be applied to the fourth embodiment.

First Variation Example

For example, non-collimated light similar to that in FIG. 17 may be applied to a lens-array type configuration as shown in the cross-sectional view in FIG. 20(a) and the right side view in FIG. 20(b).

A specific configuration of the first variation example is similar to that of the variation example (see FIG. 6 to FIG. 9) according to the first embodiment, excluding the surface shape of the first lens face 11. Therefore, details thereof are omitted.

In the first variation example, the fiber coupled light Lc of the plurality of optical fibers 5 based on the laser light La of the plurality of light-emitting elements 7 can each form the spot shape shown in FIG. 18. Therefore, compared to the variation example according to the first embodiment, multi-channel optical transmission accompanying monitoring can be more appropriately performed.

Second Variation Example

Figure 21:
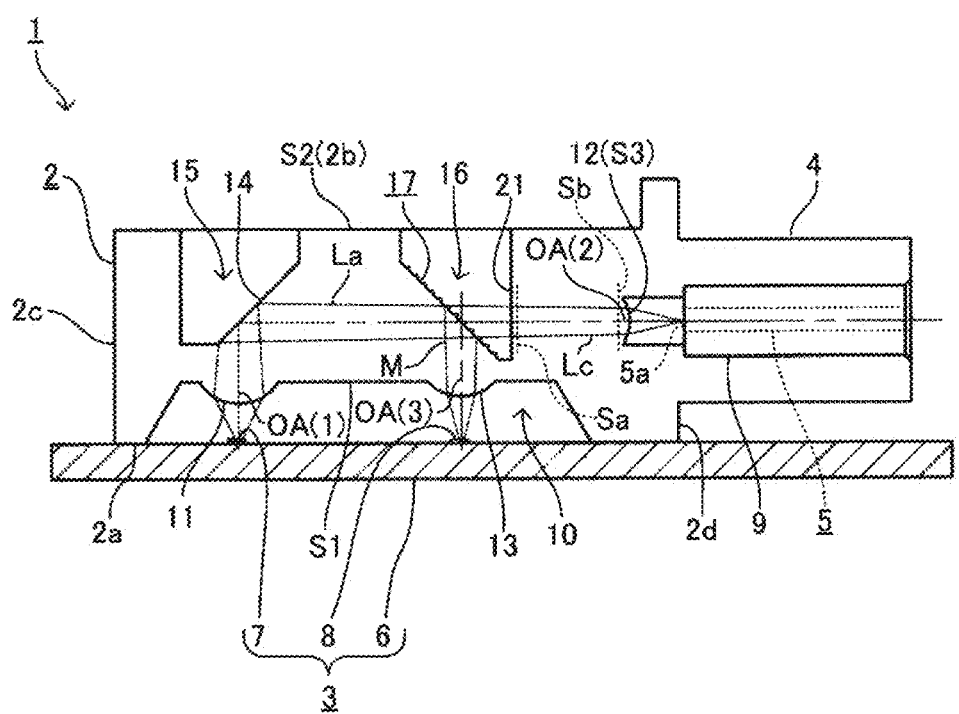
FIG. 21 A schematic configuration diagram of a second variation example according to the fourth embodiment.

In addition, as shown in the configuration in FIG. 21, the first lens face 11 may convert the laser light La that has arrived from the light-emitting element 7 to converged light (non-collimated light) of which the light beam diameter gradually decreases as the laser light La moves forward in the advancing direction. The configuration in the second variation example such as this may be actualized, for example, by the positive power of the first lens face 11 being strengthened in relation to the configuration according to the first embodiment.

Here, FIG. 22(a) to FIG. 22(c) show simulation results of beam spot shapes of the fiber coupled light Lc in positions differing from one another on the optical path of the fiber coupled light Lc in the configuration in the second variation example, such as that described above. Specifically, FIG. 22(a) shows the spot shape of the fiber coupled light Lc on a plane Sa assumed on the optical path immediately after the transmitting surface 21 in FIG. 21. In addition, FIG. 22(b) shows the spot shape of the fiber coupled light Lc on a plane Sb assumed on the optical path immediately before the second lens face 12 in FIG. 21. Furthermore, FIG. 22(c) shows the spot shape of the fiber coupled light Lc on the end face 5a of the optical fiber 5.

Figure 22:
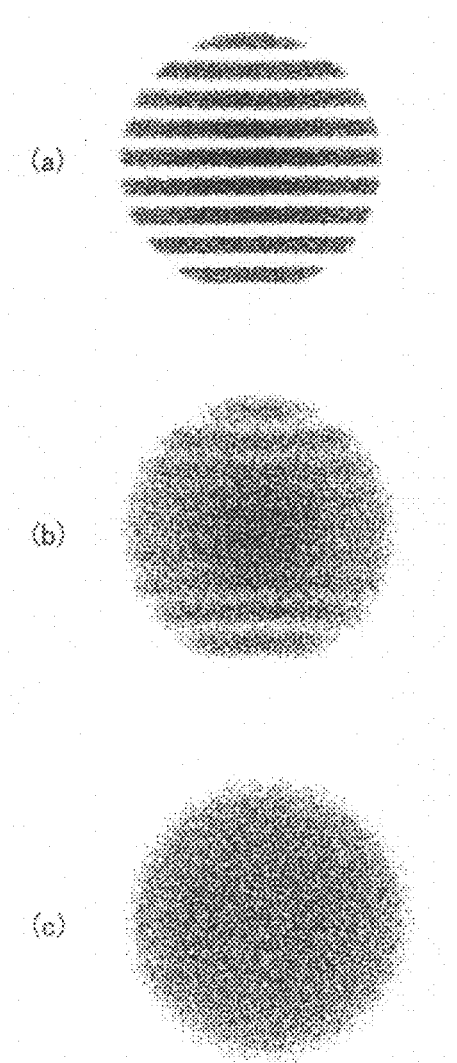
FIG. 22 A simulation diagram of the changes in spot shape (cross-sectional shape) of the fiber coupled light in differing positions on an optical path of the fiber coupled light in the second variation example according to the fourth embodiment.

As shown in FIG. 22, in the second variation example as well, in a manner similar to that in FIG. 18, the spot shape of the fiber coupled light Lc that is segmented into band shapes immediately after transmission by the segmented transmitting surface 19 ultimately forms a completely unified circular spot on the end face 5a of the optical fiber 5.

In the second variation example, in a manner similar to the configuration in FIG. 17, the intensity distribution of the fiber coupled light Lc at the end face 5a of the optical fiber 5 can be improved. Therefore, optical transmission accompanying monitoring can be more appropriately performed, compared to the first embodiment.

Third Variation Example

Furthermore, the non-collimated light (the converged light that decreases in diameter as the light advances) described in the second variation example may be applied to a lens-array type configuration as shown in the cross-sectional view in FIG. 23(a) and the right side view in FIG. 23(b).

In the third variation example, the fiber coupled light Lc of the plurality of optical fibers 5 based on the laser light La of the plurality of light-emitting elements 7 can each form the spot shape shown in FIG. 22. Therefore, compared to the variation example according to the first embodiment, multi-channel optical transmission accompanying monitoring can be more appropriately performed.

Fourth Variation Example

Still further, the non-collimated light described in the second variation example is effectively converged before arriving at the second lens face 12. Therefore, in some instances, it is not necessary to perform convergence all at once at the second lens face 12 to achieve coupling with the end face 5a of the optical fiber 5. In this instance, it is no longer necessary to give the second lens face 13 a large power. The surface shape can be simplified (almost planar). An expansion of this idea is the configuration of a fourth variation example.

Figure 24:
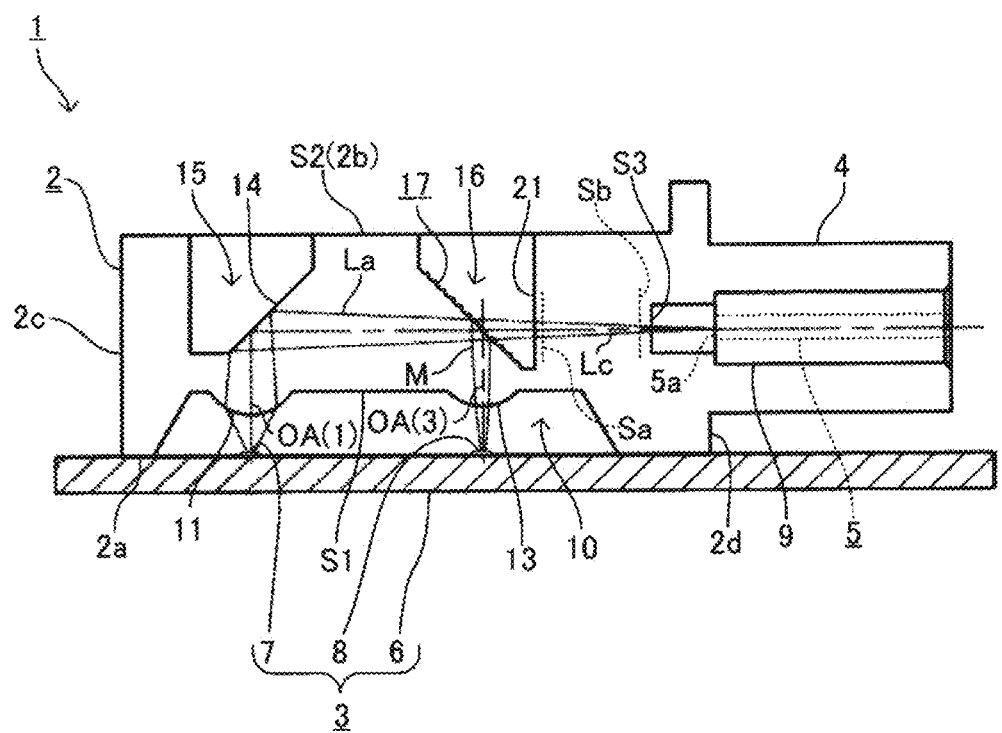
FIG. 24 A schematic configuration diagram of a fourth variation example according to the fourth embodiment.

In other words, as shown in FIG. 24, in the configuration of the fourth variation example, in addition to application of the non-collimated light that decreases in diameter as the light advances, similar to that in the second variation example, the third surface S3 is a plane that does not have the second lens face 12.

Here, FIG. 25(a) to FIG. 25(c) show simulation results of beam spot shapes of the fiber coupled light Lc in positions differing from one another on the optical path of the fiber coupled light Lc in the configuration in the fourth variation example, such as that described above. Specifically, FIG. 25(a) shows the spot shape of the fiber coupled light Lc on a plane Sa assumed on the optical path immediately after the transmitting surface 21 in FIG. 24. In addition, FIG. 25(b) shows the spot shape of the fiber coupled light Lc on a plane Sb assumed on the optical path immediately before the third surface S3 in FIG. 24. Furthermore, FIG. 25(c) shows the spot shape of the fiber coupled light Lc on the end face 5a of the optical fiber 5.

Figure 25:
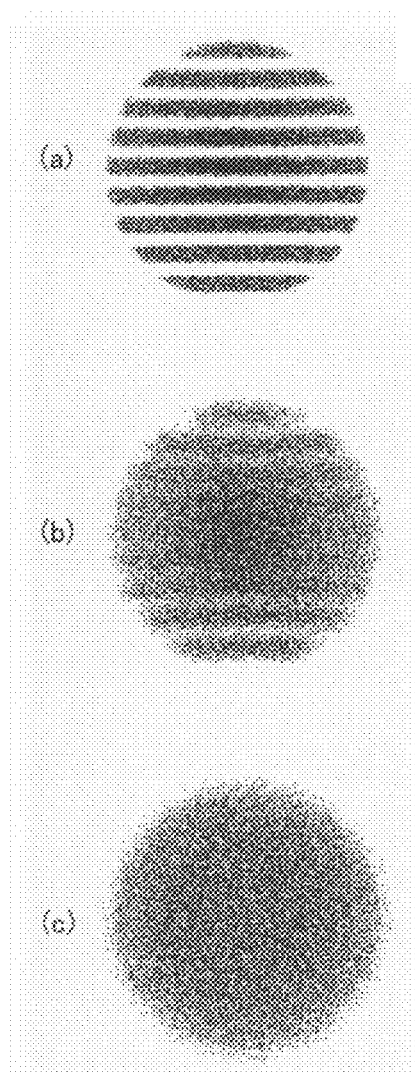
FIG. 25 A simulation diagram of the changes in spot shape (cross-sectional shape) of the fiber coupled light in differing positions on an optical path of the fiber coupled light in the fourth variation example according to the fourth embodiment.
Figure 26:
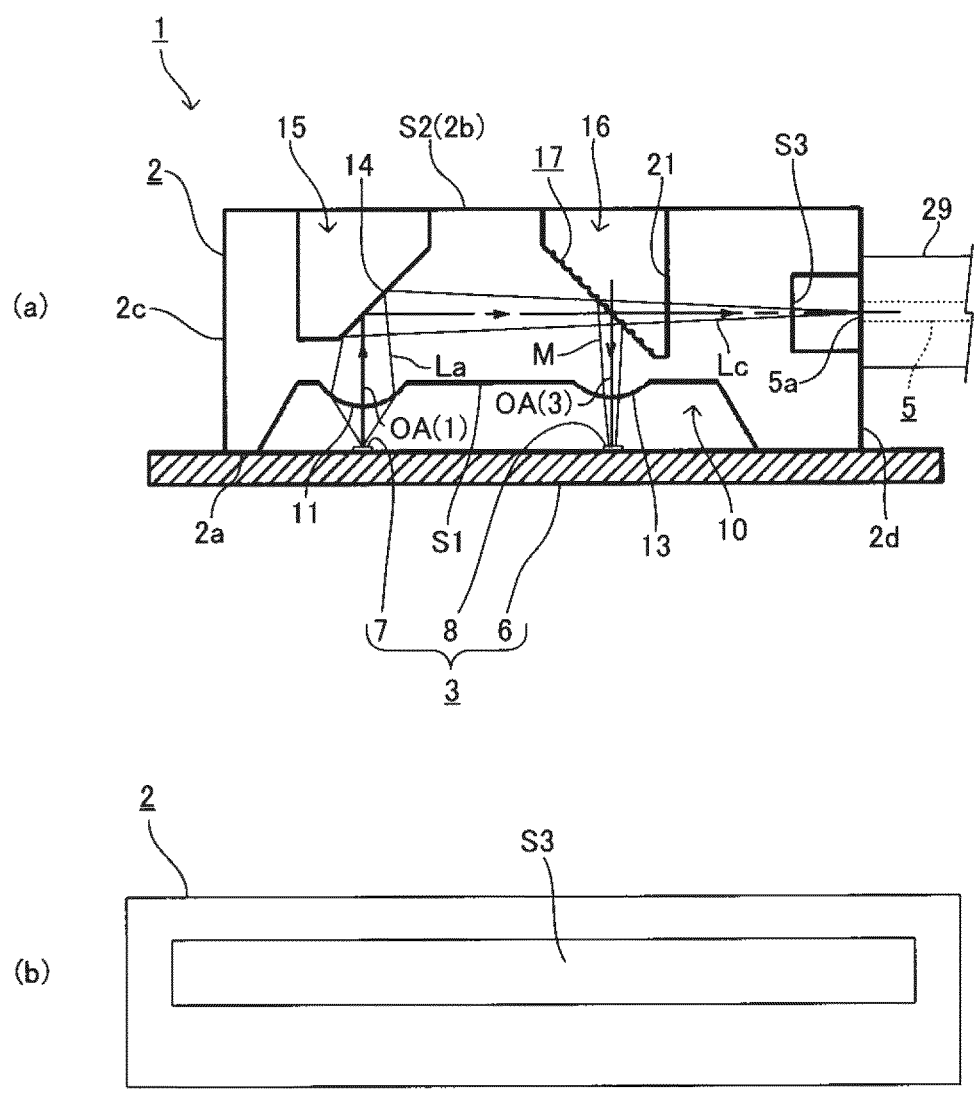
FIG. 26 A schematic configuration diagram of a fifth variation example according to the fourth embodiment.

As shown in FIG. 25, in the fourth variation example as well, in a manner similar to that in FIG. 18, the spot shape of the fiber coupled light Lc that is segmented into band shapes immediately after transmission by the segmented transmitting surface 19 ultimately forms a completely unified circular spot on the end face 5a of the optical fiber 5.

In the fourth variation example, because the second lens face 12 is no longer required, optical transmission accompanying monitoring can be more appropriately performed and cost reduction due to simplified shape can be achieved, compared to the first embodiment.

Fifth Variation Example

In addition, the configuration in which the second lens face 12 is not provided, described in the fourth variation example, may be applied to a lens-array type configuration such as that shown in FIG. 26(a) and FIG. 26(b).

The present invention is not limited to the above-described embodiments. Various modifications are possible without compromising the features of the present invention.

For example, the collimated light and the non-collimated light described in each of the above-described embodiments may be actualized by adjustment of the outgoing angle of the laser light La from the light-emitting element 7 or the like, instead of or in addition to the surface shape of the first lens face 11.

The invention claimed is:

1. An optical receptacle that is disposed between a photoelectric conversion device and an optical fiber, in which photoelectric conversion device a light-emitting element and a light-receiving element that receives monitor light for monitoring light emitted from the light-emitting element are mounted on a substrate; and that is capable of optically coupling the light-emitting element and an end face of the optical fiber, the optical receptacle comprising:

a first surface of an optical receptacle main body on which the light from the light-emitting element is incident and from which the monitor light is emitted towards the light-receiving element;

a reflective surface that is formed on a second surface of the optical receptacle main body on a side opposite to the first surface such as to have a predetermined first slope angle in relation to the first surface and such that the light of the light-emitting element that has been incident on the first surface is incident thereon from an interior side of the optical receptacle main body, and that reflects the incident light of the light-emitting element;

a recessing section that is provided in a recessing manner in a position on the second surface on a reflection direction side of the light of the light-emitting element in relation to the reflective surface;

a light separating section that forms a portion of an inner surface of the recessing section, on which the light of the light-emitting element that has been reflected by the reflective surface is incident from the interior side of the optical receptacle main body, and that separates the incident light into the monitor light that advances towards the first surface and light to be coupled with the end face of the optical fiber; and a third surface of the optical receptacle main body from which the light to be coupled with the end face of the optical fiber that has been separated by the light separating section is emitted towards the end face of the optical fiber, wherein the light separating section includes a segmented reflective surface that has a predetermined second slope angle in relation to the first surface and is disposed in a segmented manner with predetermined spaces in a predetermined segmentation direction, on which a portion of light of the light of the light-emitting element that has been reflected by the reflective surface is incident, and that reflects the incident portion of light as the monitor light, and a segmented transmitting surface that is disposed in a segmented manner such as to be positioned in areas where the segmented reflective surface is not formed and segments of the segmented reflective surface and segments of the segmented transmitting surface are alternately disposed in a segmented direction, that is disposed such as to directly opposing the reflection direction of the light of the light-emitting element in relation to the reflective surface, on which another portion of light other than the portion of light of the light of the light-emitting element that has been reflected by the reflective surface is incident, and that transmits the incident other portion of light and advances the other portion of light towards the third surface side as the light to be coupled with the end face of the optical fiber, wherein the optical receptacle main body includes transmitting surface that forms a section on the inner surface of the recessing section that opposes the light separating section, on which the light to be coupled with the end face of the optical fiber that has been transmitted by the segmented transmitting surface is incident through space between the light separating section and the transmitting surface within the recessing section, and that transmits the incident light towards the third surface side.

2. The optical receptacle according to claim 1, wherein:
the segmentation direction is a slope direction of the segmented reflective surface;
the segmented reflective surface is composed of a plurality of reflective surface portions that are elongated in a direction perpendicular to the slope direction and a normal direction of the segmented reflective surface;

the segmented transmitting surface is composed of a plurality of transmitting surface portions that are elongated along a length direction of the reflective surface portion;
the transmitting surface portion is disposed such as to be connected to the reflective surface portion adjacent thereto on the first surface side and perpendicular to the incidence direction of the other portion of light in relation to the transmitting surface portion; and
a stepped surface is formed between the transmitting surface portion and the reflective surface portion adjacent thereto on the second surface side, along the incidence direction of the light of the light-emitting element in relation to the light separating section.

3. The optical receptacle according to claim 1, wherein:
the segmentation direction is a direction perpendicular to the first surface;
the segmented reflective surface is composed of a plurality of reflective surface portions that are elongated in a direction perpendicular to the slope direction and a normal direction thereof;
the segmented transmitting surface is composed of a plurality of transmitting surface portions that are elongated along the length direction of the reflective surface portion; and
the transmitting surface portion is disposed such as to be connected to the reflective surface portion adjacent thereto and perpendicular to the incidence direction of the other portion of light in relation to the transmitting surface portion.

4. The optical receptacle according to claim 1, wherein:
the segmentation direction is a direction perpendicular to the slope direction and a normal direction of the segmented reflective surface;
the segmented reflective surface is composed of a plurality of reflective surface portions that are elongated in the slope direction;
the segmented transmitting surface is composed of a plurality of transmitting surface portions that are elongated in a direction perpendicular to the first surface and disposed such as to be perpendicular to the incidence direction of the other portion of light; and
a stepped surface is formed between the transmitting surface portion and the reflective surface portion adjacent thereto, along the incidence direction of the light of the light-emitting element in relation to the light separating section.

5. The optical receptacle according to claim 4, wherein:
the second slope angle is an angle such that the portion of light that has been reflected by the reflective surface is incident at an angle of incidence greater than the critical angle.

6. The optical receptacle according to claim 4, wherein:
the plurality of transmitting surface portions are formed having the same width as one another in a direction perpendicular to a length direction and such as to be evenly spaced in the segmentation direction.

7. The optical receptacle according to claim 4, wherein:
a first lens face is formed on the first surface, the first lens face enabling the light of the light-emitting element to be incident towards the reflective surface; and
a second lens face is formed on the third surface, the second lens face emitting the light to be coupled with the end face of the optical fiber towards the end face of the optical fiber.

8. The optical receptacle according to claim 7, wherein:
as the photoelectric conversion device, a photoelectric conversion device is disposed in which a plurality of light-emitting elements are arrayed along a length direction of the reflective surface portion;
the optical fiber is disposed such that a plurality thereof are arrayed along the length direction of the reflective surface portion; and
the first lens face and the second lens face are respectively formed such that a plurality thereof are arrayed along the length direction of the reflective surface portion.

9. The optical receptacle according to claim 8, wherein:
a third lens face is formed on the first surface, the third lens face emitting the monitor light towards the light-receiving element.

10. The optical receptacle according to claim 4, wherein:
the first surface advances the light of the light-emitting element towards the reflective surface as collimated light.

11. The optical receptacle according to claim 4, wherein:
the first surface advances the light of the light-emitting element towards the reflective surface as light of which a light beam diameter changes as the light advances forward in an advancing direction.

12. The optical receptacle according to claim 11, wherein:
the first surface advances the light of the light-emitting element as light of which the light beam diameter gradually increases as the light advances forward in the advancing direction.

13. The optical receptacle according to claim 11, wherein:
the first surface advances the light of the light-emitting element as light of which the light beam diameter gradually decreases as the light advances forward in the advancing direction.

14. An optical module comprising:
an optical receptacle according to claim 4, said optical receptacle being disposed between a photoelectric convention device and an optical fiber, and
the photoelectric conversion device in which a light-emitting element and a light-receiving element that receives monitor light for monitoring light emitted from the light-emitting element are mounted on a substrate.

15. An optical module comprising:
an optical receptacle according to claim 4, said optical receptacle being disposed between a photoelectric convention device and an optical fiber; and
the photoelectric conversion device in which a light-emitting element and a light-receiving element that receives monitor light for monitoring light emitted from the light-emitting element are mounted on a substrate; and
the photoelectric conversion device is disposed in which the plurality of the light-emitting elements are arrayed along a length direction of the reflective surface portion.

* * * * *